(12) United States Patent
Aoki et al.

(10) Patent No.: US 7,609,922 B2
(45) Date of Patent: Oct. 27, 2009

(54) OPTICAL MODULE, OPTICAL TRANSMISSION SYSTEM, AND FABRICATION METHOD FOR OPTICAL MODULE

(75) Inventors: Shigenori Aoki, Kawasaki (JP); Masayuki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/475,970

(22) Filed: Jun. 28, 2006

(65) Prior Publication Data

US 2007/0237449 A1    Oct. 11, 2007

(30) Foreign Application Priority Data

Mar. 27, 2006    (JP) .............................. 2006-085255

(51) Int. Cl.
    *G02B 6/30* (2006.01)
(52) U.S. Cl. .................................................... 385/49
(58) Field of Classification Search ................... 385/14, 385/32, 49
    See application file for complete search history.

(56) References Cited

U.S. PATENT DOCUMENTS

| | | | | |
|---|---|---|---|---|
| 5,835,659 | A * | 11/1998 | Ota et al. ..................... 385/137 |
| 5,991,492 | A * | 11/1999 | Ota et al. ..................... 385/137 |
| 6,810,160 | B2 * | 10/2004 | Sugama et al. ................. 385/14 |
| 7,068,871 | B2 * | 6/2006 | Sugama et al. ................. 385/14 |
| 7,164,814 | B2 * | 1/2007 | Ohtsu et al. ................... 385/14 |
| 7,215,852 | B2 * | 5/2007 | Doerr et al. ................... 385/46 |
| 7,532,782 | B2 * | 5/2009 | Bragg et al. ................... 385/14 |
| 2005/0058399 | A1 * | 3/2005 | Nishizawa et al. ............. 385/39 |
| 2006/0045418 | A1 * | 3/2006 | Cho et al. ...................... 385/31 |

FOREIGN PATENT DOCUMENTS

| | | |
|---|---|---|
| JP | 2003-322740 | 11/2003 |
| JP | 2005-115346 | 4/2005 |

OTHER PUBLICATIONS

B.E. Lemoff, et al.; "MAUI: Enabling Fiber-to-the-Processor With Parallel Multiwavelength Optical Interconnects;" *Journal of Lightwave Technology*; vol. 22; No. 9; Sep. 2004; pp. 2043-2054./ Discussed in the specification.

* cited by examiner

*Primary Examiner*—Uyen Chau N Le
*Assistant Examiner*—John M Bedtelyon
(74) *Attorney, Agent, or Firm*—Kratz, Quintos & Hanson, LLP

(57) ABSTRACT

An optical module includes a substrate, one or a plurality of planar optical devices mounted on the substrate, and a waveguide block including one or a plurality of curved waveguides formed on a plane. The waveguide block is mounted on the substrate such that the plane on which the curved waveguides are formed is perpendicular to the substrate and the curved waveguides and an incidence face or an emitting face of the planar optical device are opposed to each other on one end face of the waveguide block. Further, the waveguide block is configured so that an optical fiber can be connected to the other end face of the waveguide block which is orthogonal to the one end face.

1 Claim, 16 Drawing Sheets

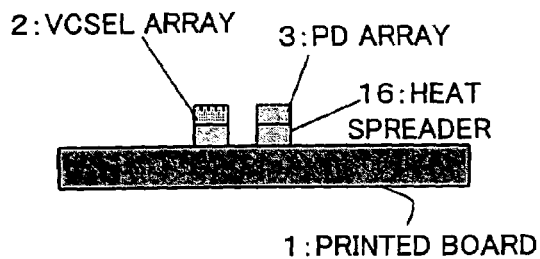
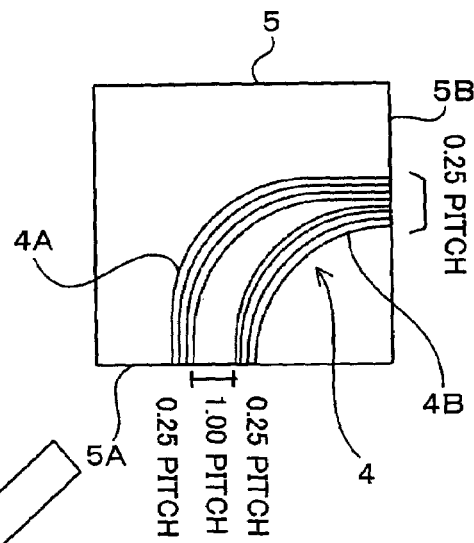
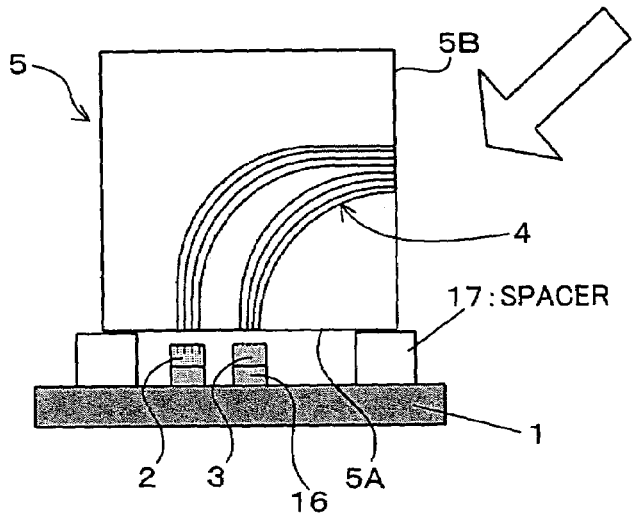
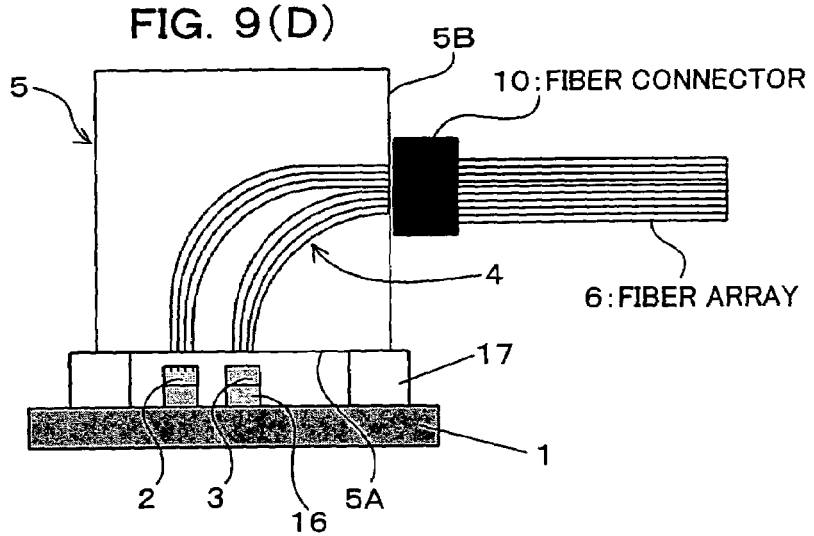

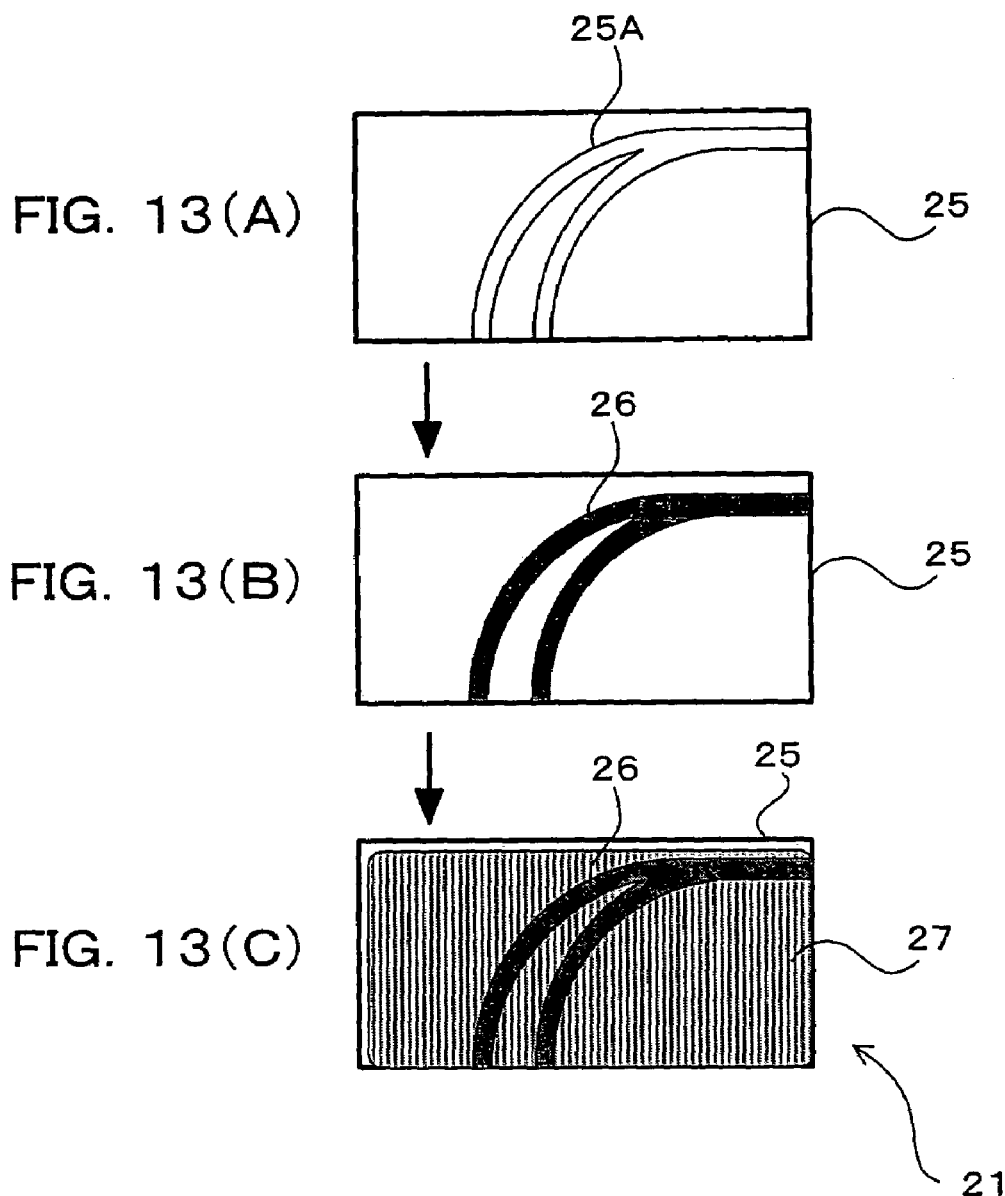

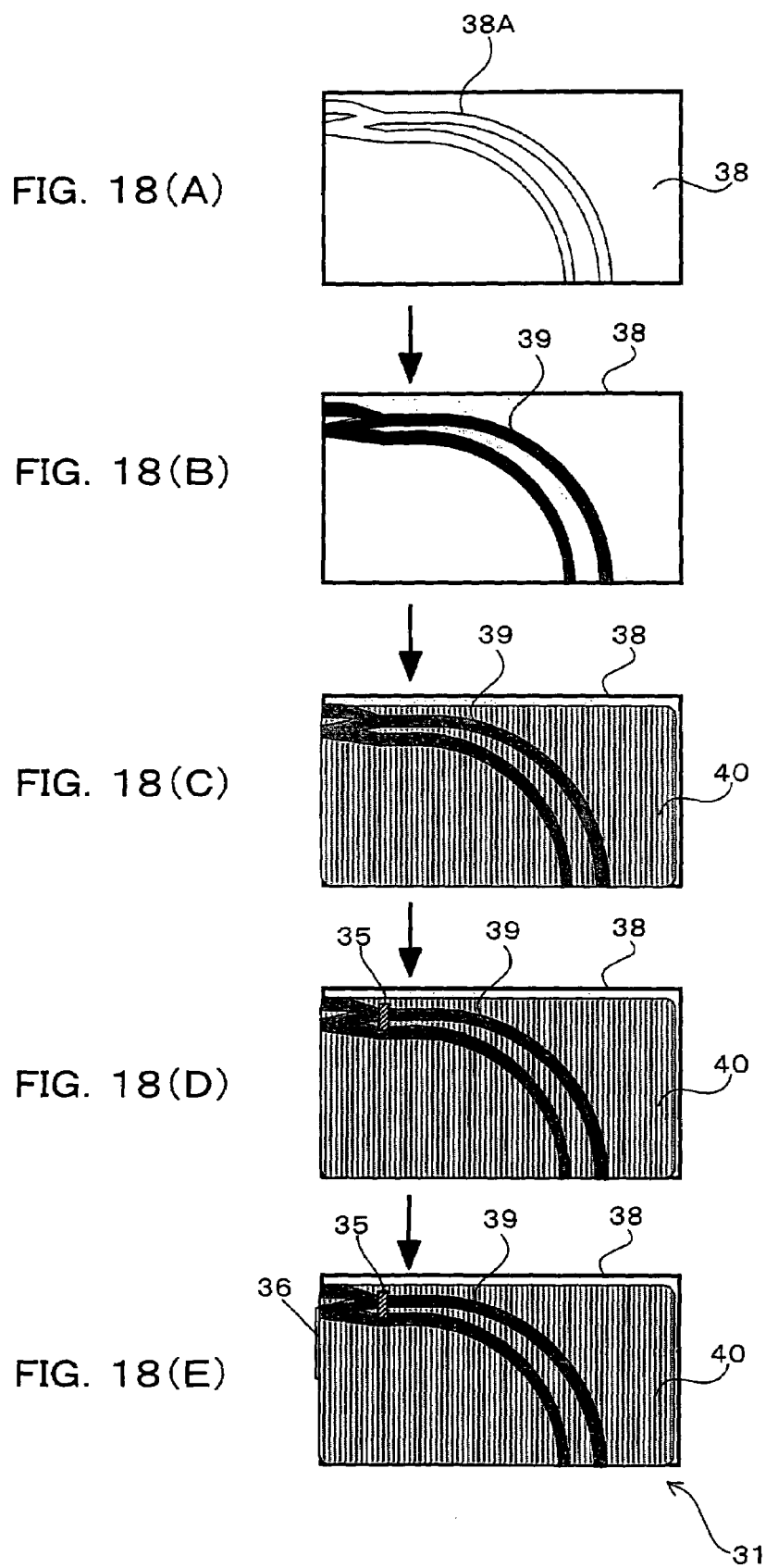

1: PRINTED BOARD　　3A: PHOTO-DETECTOR ARRAY　　3B

30: RECEPTION SIDE WAVEGUIDE BLOCK
35
36
17: SPACER　　3A　　16　　3B

6: FIBER ARRAY　　35　　30
36　　17
3A　　16　　3B

OPTICAL MODULE, OPTICAL TRANSMISSION SYSTEM, AND FABRICATION METHOD FOR OPTICAL MODULE

CROSS REFERENCE TO RELATED APPLICATIONS

This application is based on and hereby claims priority to Japanese Application No. 2006-085255 filed on Mar. 27, 2006 in Japan, the contents of which are hereby incorporated by reference.

BACKGROUND OF THE INVENTION (1) Field of the Invention

This invention relates to an optical module, an optical transceiver, an optical transmission system and a fabrication method for an optical module, suitable for use with a multi-channel optical transceiver (for example, a wavelength division multiplexing multi-channel optical transceiver) which includes a planar optical device such as, for example, a planar light emitting laser or a photo-diode (photo-detector).

(2) Description of the Related Art

In a case wherein an optical module such as, for example, a multi-channel optical transceiver uses a planar optical device such as a planar light emitting laser or photo-diode, since a light incidence face or a light emitting face of the planar optical element extends in parallel to a mounting board, light is incident or emitted perpendicularly upon or from the mounting board.

Meanwhile, in such an optical module as mentioned above, it is necessary to achieve reduction in size and thickness.

In order to achieve reduction in size and thickness, preferably optical fibers (optical fiber array) are disposed in parallel to a mounting board. In this instance, end faces of the optical fiber and the light incidence face or light emitting face of the planar optical device have a relationship of the substantially right angle to each other. Therefore, such various proposals as described below have been made in order to curve the paths (light paths) of incidence or emitting light perpendicularly to the light incidence face or light emitting face of a planar optical device mounted on a board by approximately 90 degrees to optically connect the optical fibers and the planar optical device to each other.

For example, Japanese Patent laid-Open No. 2005-115346 discloses a technique which uses an optical waveguide structure of a three-dimensional configuration wherein optical waveguides are formed on a curved plane for curving the advancing direction of light such that light to be incident to or emitted from a planar optical device is guided along the curved plane and coupled to an optical fiber array (refer to, for example, FIGS. 27 and 28).

Meanwhile, Japanese Patent Laid-Open No. 2003-322740 discloses that, in order to optically couple optical waveguides provided along a mounting face and a planar light emitting laser to each other, it is necessary to convert the direction of light by 90° and, as a method therefor, a 45° mirror is formed as a direction converter on a waveguide film which connects devices to each other.

Incidentally, as one of methods of making it possible to expand the transmission band width, an attempt to introduce a wavelength division multiplexing technique to increase the transmission capacity per one channel is available, and it is disclosed that a multiplexer or a demultiplexer which uses spatial propagation of light and a reflecting optical system is provided between a planar light emitting laser or a photo-diode and optical fibers (for example, refer to Brian E. Lemoff et al., "MAUI: Enabling Fiber-to-the-Processor with Parallel Multiwavelength Optical Interconnects", JOURNAL OF LIGHTWAVE TECHNOLOGY, VOL. 22, NO. 9, September, 2004).

Incidentally, in an optical module such as a multi-channel optical transceiver as described above, it is a subject to reduce the cost for a portion (optical coupling portion) which optically interconnects a planar optical device [planar optical device array; for example, a VCSEL (Vertical-Cavity Surface-Emitting Laser) array or a PD (Photo Detector) array] and optical fibers (optical fiber array).

Therefore, also common use of parts has been and is proceeding gradually. At present, both of the pitch (array pitch) between a plurality of planar optical devices which form a planar optical device array and the pitch (array pitch) between a plurality of optical fibers which form an optical fiber array have been standardized to 0.25 mm. Further, both of the number (array number) of planar optical devices which form a planar optical device array and the number (array number) of optical fibers which form an optical fiber array have been standardized to 4, 8, 12 and 24.

Meanwhile, for example, in the case of a multi-channel optical transceiver, a VCSEL array and a PD array are mounted in a juxtaposed relationship with each other on a board. However, a mounting gap (gap between chips) of, for example, approximately 1 mm is essentially required between the arrays.

In this instance, also between optical fibers (VCSEL fibers) optically connected to the VCSEL array and optical fibers (PD fibers) optically connected to the PD array, a gap corresponding to the mounting gap is required.

Once the pitch is standardized to 0.25 mm between a VCSEL array or a PD array and an optical fiber array and also the array number is standardized to 4, 8, 12 or 24 in such a manner as described above, in order, for example, for a multi-channel optical transceiver of 8 channels (4-channel input+ 4-channel output) to be ready for the standardization, such a countermeasure is taken as to adopt a standardized optical fiber array for 12 channels by adding 4 channels corresponding to the gap (for example, 1 mm) between the chips to 8 channels originally required for the input and the output.

In this instance, optical fibers for the four channels corresponding to the gap between the chips are useless because they are not used for the input or the output. Further, since an optical fiber array for 12 channels is inferior in all aspects such as the performance and the price to an optical fiber array for 8 channels, preferably an optical fiber array for 8 channels is used.

Therefore, it is desired to implement a simple and convenient structure which can optically connect planar optical devices (planar optical device array) such as planar light emitting devices or planar photo-detectors and optical fibers (optical fiber array) to each other without providing a gap, which corresponds to a gap (mounting gap) between the chips, between optical fibers optically connected to the planar light emitting devices (VCSEL array) and optical fibers optically connected to the planar photo-detectors (PD array).

It is to be noted that this problem is solved in principle if it is possible to produce a part which connects to an optical fiber array for 8 channels with the waveguide distance reduced midway from the planar optical devices to the optical fibers.

However, where an optical waveguide structure of a three-dimensional configuration wherein optical waveguides are formed on a curved plane for curving the advancing direction of light is used as disclosed, for example, in Japanese Patent Laid-Open 2005-115346, it is necessary to form optical waveguides of a high degree of accuracy for optically connecting optical devices and optical fibers to each other on a curved plane. However, at present, a countermeasure which can implement such a complicated highly accurate three-dimensional structure as described above simply and conveniently is not available and has not been placed into practical use. Further, it is difficult from restrictions in a fabrication method to implement a structure which can simultaneously achieve also pitch conversion.

Meanwhile, another countermeasure wherein a mirror (90° deflecting mirror) is used to achieve high-density optical connection between chips and pitch conversion as disclosed, for example, in Japanese Patent Laid-Open No. 2003-322740, is disadvantageous in that the loss at the mirror (that is, the absorption loss on the surface of the mirror) is significant and the optical connection and the pitch conversion are liable to be influenced by the accuracy in alignment and the accuracy in working. Further, crosstalk at an intersecting location between waveguides cannot be avoided, and the optical performance is not high.

Incidentally, although the aforementioned thesis "MAUI: Enabling Fiber-to-the-Processor with Parallel Multiwavelength Optical Interconnects" discloses a high-grade module which introduces a wavelength division multiplexing technique and uses spatial propagation of light and a reflecting optical system, the module has the following problems.

First, since a spatial propagation system is used, the beam diameter cannot be made very small (for example, a diameter of 250 μm), there is a limitation to miniaturization of the module. Further, since a spatial multiple reflecting optical system is adopted, alignment is difficult. Furthermore, it is difficult to assure a high impact resistance of the product. As a result, also reduction in cost is difficult.

SUMMARY OF THE INVENTION

Aspect of the present invention can provide an optical module, an optical transceiver, an optical transmission system and a fabrication method for an optical module wherein optical connection between planar optical devices [for example, planar light emitting lasers or photo-diodes (photo-detectors)] mounted on a board and optical fibers attached in parallel to the board can be implemented simply and readily.

According to one aspect of the present invention, an optical module includes a substrate, one or a plurality of planar optical devices mounted on the substrate, and a waveguide block including one or a plurality of curved waveguides formed on a plane, the waveguide block being mounted on the substrate such that the plane on which the curved waveguides are formed is perpendicular to the substrate and the curved waveguides and an incidence face or an emitting face of the planar optical device are opposed to each other on one end face of the waveguide block, and being configured so that an optical fiber can be connected to the other end face of the waveguide block which is orthogonal to the one end face.

According to another aspect of the present invention, an optical transmission system includes two such optical modules as described above which are optically connected to each other by an optical fiber array formed from a plurality of optical fibers, the optical fiber array being connected to the two optical modules while twisted by 180 degrees between the two optical modules such that the longest one of the curved waveguides of one of the optical modules and the shortest one of the curved waveguides of the other one of the optical modules are connected to each other.

According to a further aspect of the present invention, there is provided an optical transceiver including, as the optical modules described above, an optical transmitter (the module described above wherein the plural planar optical devices are a plurality of planar light emitting devices having light emission wavelengths different from each other and arranged in series along an end face of the waveguide block, and the waveguide block includes a waveguide type multiplexer formed by overlapping the curved waveguides on a one-end side thereof) and an optical receiver (the optical module described above wherein the planar optical devices are a plurality of planar photo-detectors arranged in series along an end face of the waveguide block, and the waveguide block includes a waveguide type demultiplexer connected to each of the plural curved waveguides, the waveguide type demultiplexer including a plurality of wavelength filters connected to the plural curved waveguides, a mirror provided on the end face of the waveguide block, and a channel optical waveguide formed between the wavelength filters and the mirror), the optical transmitter and the optical receiver being stuck integrally to each other on the back face side of the substrates.

According to a still further aspect of the present invention, a fabrication method for an optical module includes the steps of producing a waveguide block including one or a plurality of curved waveguides on a plane, mounting one or a plurality of planar optical devices on a substrate, and mounting the waveguide block on the substrate such that the plane on which the curved waveguide is formed is perpendicular to the substrate and the curved waveguide and an incidence face or an emitting face of the planar optical device are opposed to each other on one end face of the waveguide block.

With the optical module, optical transceiver, optical transmission system and fabrication method for an optical module of the above aspects of the present invention, there is an advantage that optical connection between planar optical devices [for example, face light emitting lasers, photo-diodes (photo-detectors) and so forth] mounted on a board and optical fibers attached in parallel to the board can be implemented simply and readily.

The above and other aspects and advantages of the present invention will become apparent from the following description and the appended claims, taken in conjunction with the accompanying drawings.

BRIEF DESCRIPTION OF THE DRAWINGS

FIGS. 9(A) to 9(D) are schematic views illustrating a fabrication method of the optical module according to the first embodiment of the present invention;

FIGS. 13(A) to 13(C) are schematic views illustrating a fabrication method of a transmitter film waveguide (transmitter waveguide block) provided in the optical transmitter as an optical module according to the second embodiment of the present invention;

FIGS. 18(A) to 18(E) are schematic views illustrating a fabrication method of a receiver film waveguide (receiver waveguide block) provided in the optical receiver as an optical module according to the second embodiment of the present invention.

DESCRIPTION OF THE PREFERRED EMBODIMENTS

In the following, an optical module, an optical transceiver, an optical transmission system and a fabrication method for an optical module according to embodiments of the present invention are described.

First Embodiment

First, an optical module, an optical transceiver, an optical transmission system and a fabrication method for an optical module according to a first embodiment of the present invention are described with reference to FIGS. 1 to 7, 8(A) to 8(D) and 9(A) to 9(D).

The optical module according to the present embodiment is, for example, a multi-channel optical transceiver which includes a function (optical transmitter) for converting electric signals inputted thereto into optical signals and transmitting the optical signals through optical fibers in the form of an array, and a function (optical receiver) for converting optical signals inputted thereto through an optical fiber array into electric signals and receiving the electric signal.

Figure 1:
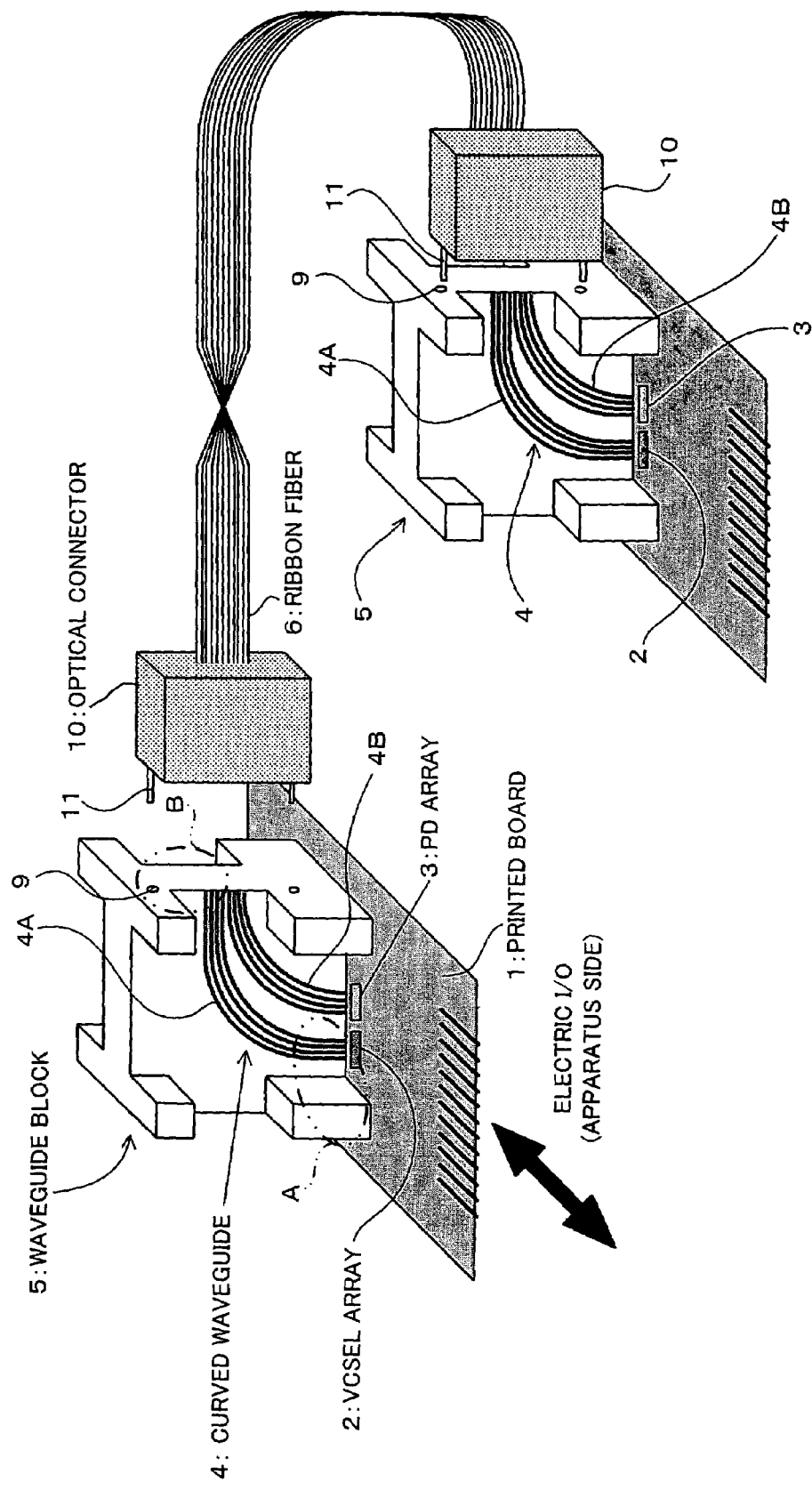
FIG. 1 is a schematic view showing a configuration of an optical module according to a first embodiment of the present invention.

The present multi-channel optical transceiver includes, for example as shown in FIG. 1, a printed board (circuit board) 1, a planar photo-detector array (PD array chip) 3 formed from a plurality of planar photo-detectors [here, photo-diodes; PDs] each having an incidence face on the surface thereof, and a planar light emitting device array (VCSEL array chip) 2 formed from a plurality of planar light emitting devices [here, planar light emitting lasers; VCSELs (Vertical-Cavity Surface-Emitting Lasers)] each having an emitting face on the surface thereof, and a waveguide block (waveguide array) 5 including a plurality of curved waveguides 4 having a function for converting the pitch. In the following, the planar photo-detectors and the planar light emitting devices are sometimes referred to collectively as planar optical devices.

The planar photo-detector array 3 and the planar light emitting device array 2 are mounted on the printed board 1 in such a manner that a plurality of planar light emitting devices and a plurality of planar photo-detectors line up along a single straight line as seen in FIG. 1.

Here, the multi-channel optical transceiver includes a single planar photo-detector array 3 and a single planar light emitting device array 2, and therefore, it includes a plurality of planar optical device arrays. It is to be noted that the multi-channel optical transceiver may otherwise be formed as a multi-channel optical receiver which includes only one planar photo-detector array 2 or a multi-channel optical transmitter which includes only one planar light emitting device array 2. Or, the multi-channel optical transceiver may otherwise be formed as an optical transceiver which includes a single planar photo-detector and a single planar light emitting device. Further, the multi-channel optical transceiver may otherwise be formed as an optical module which includes only one planar optical device such as an optical receiver which includes only one planar light emitting device or an optical transmitter which includes only one planar light emitting device. In this instance, the waveguide block 5 may include a single curved waveguide formed on a plane.

Figure 2:
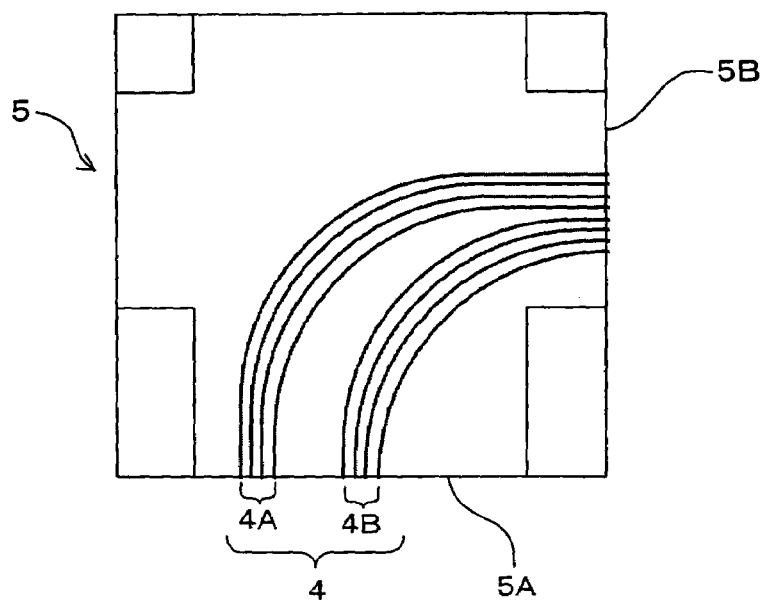
FIG. 2 is a schematic view showing a configuration of a waveguide block provided in the optical module according to the first embodiment of the present invention.

In the present embodiment, the curved waveguides 4 provided on the waveguide block 5 are formed on a plane as seen in FIG. 2. Therefore, the degree of freedom in the method of fabrication is high and the curved waveguides 4 can be fabricated readily, for example, by a molding method based on a planar metal mold fabricated with an electroformed replica. It is to be noted that a particular method of formation of the curved waveguides 4 is hereinafter described.

Further, in the present embodiment, the curved waveguides 4 include a plurality light emitting device curved waveguides 4A individually optically connected to the planar light emitting devices, and a plurality of photo-detector curved waveguides 4B individually optically connected to the planar photo-detectors as seen in FIGS. 1 and 2.

The light emitting device curved waveguides 4A are formed such that, as shown in FIGS. 1 and 2, they have a distance (pitch) corresponding to the distance (pitch) of the planar light emitting devices on an end face 5A of the waveguide block 5 but have a distance (pitch) corresponding to the distance (pitch) of optical fibers, which form an optical fiber array (ribbon fiber) 6, on the other end face 5B of the waveguide block 5.

Meanwhile, the photo-detector curved waveguides 4B are formed such that, as shown in FIGS. 1 and 2, they have a distance (pitch) corresponding to the distance (pitch) of the planar photo-detectors on the end face 5A of the waveguide block 5 but have a distance (pitch) corresponding to the distance (pitch) of the optical fibers, which form the optical fiber array 6, on the other end face 5B of the waveguide block 5.

Further, in the present embodiment, as seen in FIGS. 1 and 2, the distance between the light emitting device curved waveguides 4A and the photo-detector curved waveguides 4B is a distance (pitch) corresponding to the distance (pitch) between the planar light emitting device array 2 and the planar photo-detector array 3 on the end face 5A but is a distance (pitch) corresponding to the distance (pitch) of the optical fibers, which form the optical fiber array 6, on the other end face 5B.

By forming the curved waveguides 4 so as to be compatible with the array pitch of the optical fiber array 6 in this manner, the curved waveguides 4 can convert the mounting gap (chip distance) between the planar light emitting device array 2 and the planar photo-detector array 3 into an arbitrary optical fiber pitch irrespective of the mounting gap (even if the planar light emitting device array 2 and the planar photo-detector array 3 are disposed in a spaced relationship by an arbitrary distance from each other). Consequently, such a situation that part of the optical fiber array becomes wasteful depending upon the mounting gap between the planar light emitting device array 2 and the planar photo-detector array 3 as in the conventional apparatus described hereinabove can be prevented. Therefore, for example, in an optical transceiver for 8 channels, the necessity to use an optical fiber array for 12 channels is eliminated, and a high cost reduction effect can be anticipated.

In the present embodiment, the curved waveguides 4 extend from the end face 5A of the waveguide block 5 to the other end face 5B which extends orthogonally to the end face 5A as seen in FIG. 2. In other words, the curved waveguides 4 are formed as curved waveguides curved substantially to the right angle in a plane.

The waveguide block 5 having the configuration described above is mounted on the printed board 1 such that the plane on which the curved waveguides 4 are formed extends perpendicularly to the printed board 1 and besides the curved waveguides 4 and the incidence faces or the emitting faces of the planar optical devices mounted on the printed board 1 are opposed to each other on the end face 5A as seen in FIG. 1. Consequently, the curved waveguides 4 provided on the waveguide block 5 and the planar optical devices which form the planar optical device arrays 2 and 3 are optically connected to each other. It is to be noted that the printed board 1 is electrically connected to an external apparatus such that an electric signal is inputted to or outputted from the external apparatus (electric I/O).

Here, the end face 5A of the waveguide block 5 is opposed to the surface of the board. Meanwhile, the optical fiber array 6 formed from the optical fibers is optically connected to the other end face 5B of the waveguide block 5 which extends orthogonally to the end face 5A.

In this instance, the optical fiber array 6 is mounted in parallel to the printed board 1, and the end faces of the optical fibers and the incidence faces or the emitting faces of the planar optical device arrays 2 and 3 have a substantially right-angled positional relationship. However, the planar optical device arrays 2 and 3 and the optical fiber array 6 are optically connected to each other through the waveguide block 5 (that is, the plural curved waveguides 4 provided on the waveguide block 5) such that the paths (light paths) of light which comes in or goes out perpendicularly to the incidence faces or the emitting faces of the planar optical devices mounted on the printed board 1 are curved by approximately 90 degrees.

Incidentally, where such a waveguide block 5 as described above is fabricated actually, it is preferably configured such that not only it has such a structure that the light paths are curved substantially to the right angle but also a lens and positioning elements (for example, positioning convex/concave elements and so forth) are integrated with the waveguide block 5. In this instance, a transparent polymer material which can use a mold is effectively used as a material of the waveguide block 5. This makes it possible to produce a complicated planar waveguide configuration simply and conveniently.

Figure 4:
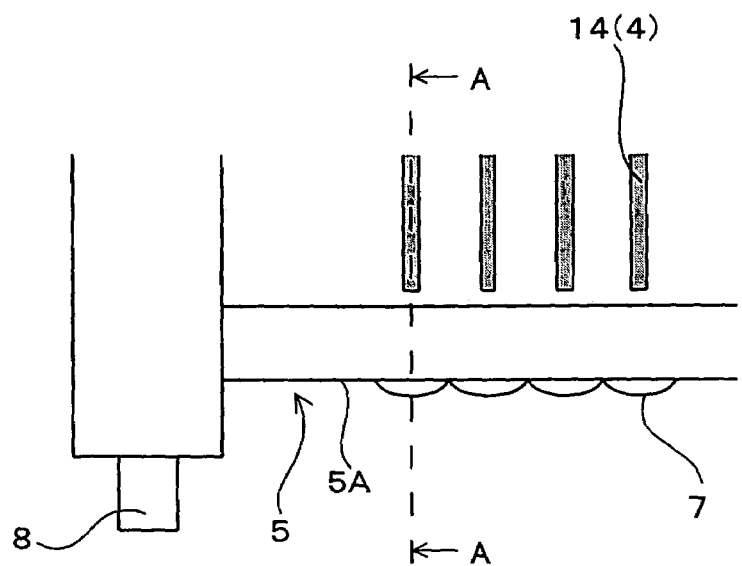
FIG. 4 is a schematic view showing a configuration of the waveguide block provided in the optical module according to the first embodiment of the present invention and is an enlarged front elevational view showing a portion denoted by A in FIG. 1 in an enlarged scale.
Figure 5:
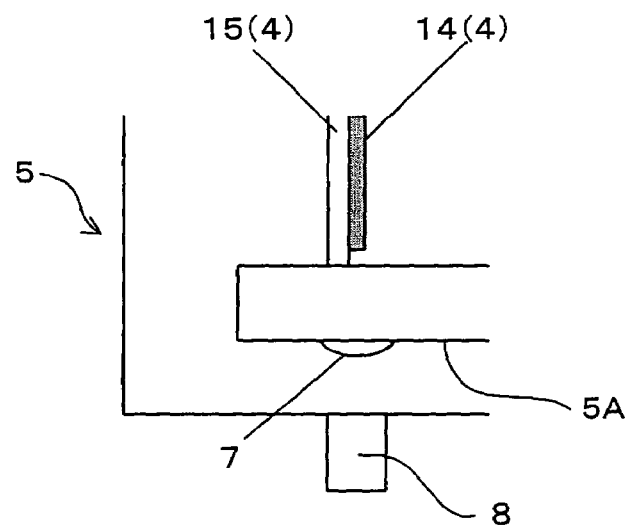
FIG. 5 is a schematic view showing a configuration of the waveguide block provided in the optical module according to the first embodiment of the present invention and is a sectional view taken along line A-A of FIG. 4.
Figure 6:
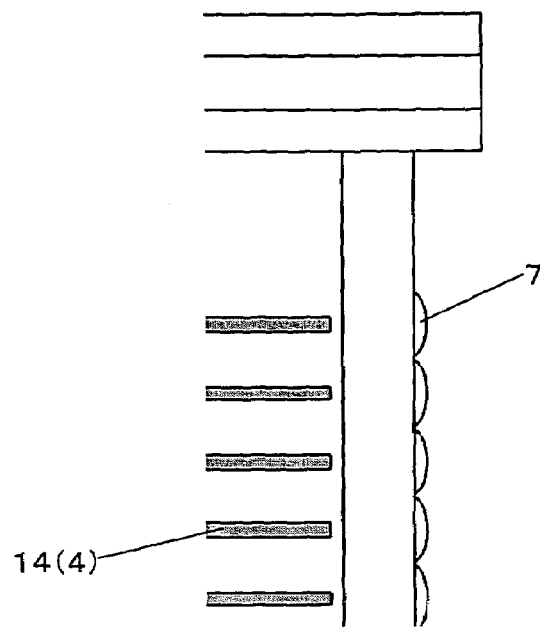
FIG. 6 is a schematic view showing a configuration of the waveguide block provided in the optical module according to the first embodiment of the present invention and is an enlarged front elevational view showing a portion denoted by B in FIG. 1 in an enlarged scale.
Figure 7:
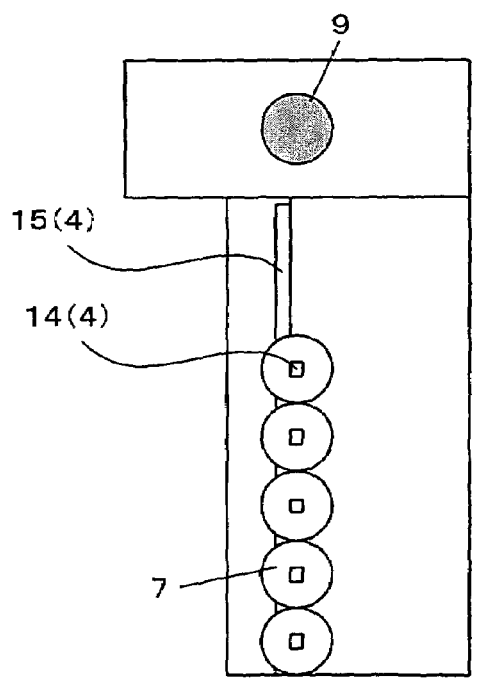
FIG. 7 is a schematic view showing a configuration of the waveguide block provided in the optical module according to the first embodiment of the present invention and is an enlarged right side elevational view showing the portion B in FIG. 1 in an enlarged scale.

Therefore, in the present embodiment, a lens 7 is provided at each of positions of the end face 5A of the waveguide block 5 corresponding to end faces of waveguide cores 14 which individually form the curved waveguides 4 as seen in FIGS. 4 and 5. Meanwhile, another lens 7 is provided at each of positions of the other end face 5B of the waveguide block 5 corresponding to end faces of the waveguide cores 14 which form the curved waveguides 4 as seen in FIGS. 6 and 7. It is to be noted that, in FIGS. 5 and 7, reference numeral 15 denotes a cladding film which forms the curved waveguides 4.

Further, the waveguide block 5 includes a board side positioning section (here, a positioning pin 8) provided on the end face 5A side for positioning the waveguide block 5 with respect to the printed board 1 as seen in FIGS. 4 and 5. Further, the waveguide block 5 includes an optical fiber side (optical connector side) positioning section (here, a positioning pin insertion hole 9) provided on the other end face 5B side for positioning the waveguide block 5 with respect to the optical fiber array 6 formed from a plurality of optical fibers.

It is to be noted that, in order to facilitate assembly, the end faces of the optical fiber array (ribbon fiber) 6 are preferably terminated by an optical connector 10 compatible with an array such as, for example, an MT (mechanically transferable) type optical connector.

Figure 3:
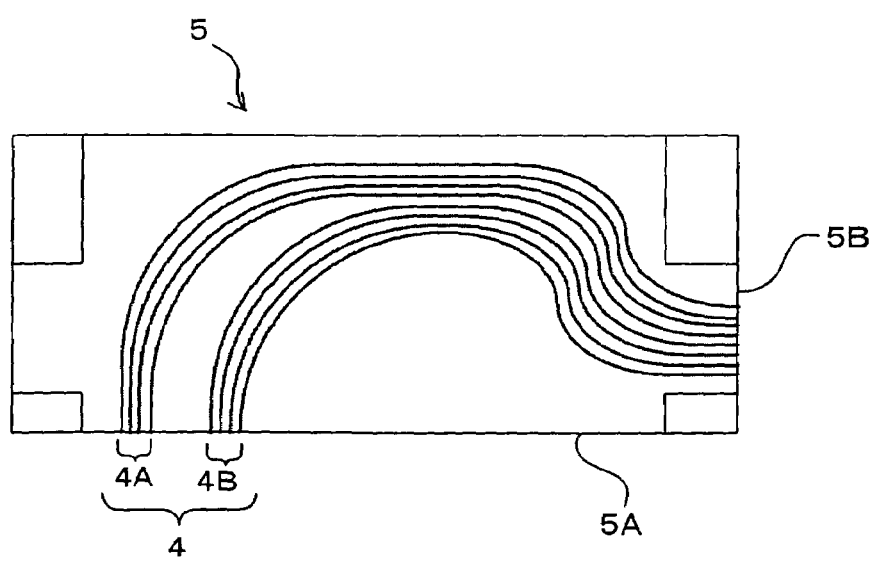
FIG. 3 is a schematic view showing a modification to the waveguide block provided in the optical module according to the first embodiment of the present invention.

In this instance, positioning pins (optical connector side positioning sections) 11 are provided on the outer side on an extension line of the optical fiber array 6 as seen in FIG. 1. Since the optical fiber array 6 and the curved waveguides 4 are disposed on the same plane, a positioning pin insertion hole 9 for inserting one of the positioning pins 11 is provided above the curved waveguides 4, and this increases the height of the waveguide block 5. Therefore, when it is intended to minimize the thickness, as seen in FIG. 3, the curved waveguides 4 should be curved substantially to the right angle once and then curved back so that the curved waveguides 4 may be positioned at a position as low as possible on the other end face 5B (end face on the optical fiber connection side) of the waveguide block 5 (that is, the curved waveguides 4 are formed so as to be shifted to the printed board 1 side on the other end face 5B) thereby to lower the position of the positioning pin insertion hole 9 provided above the curved waveguides 4. By the configuration just described, reduction in thickness of the optical module can be implemented. Further, since also the optical fiber array 6 is mounted at a position as low as possible, also the height of the entire module (thickness of the module) including the optical fiber array can be reduced, and consequently, reduction in thickness can be anticipated. Such a configuration as just described is effective particularly where the number of channels is great.

It is to be noted that two optical modules configured in such a manner as described above (having the same configuration) are prepared and optically connected to each other by the optical fiber array 6 formed from a plurality of optical fibers to configure an optical transmission system, as seen in FIG. 1.

However, in the present optical module, since the curved waveguides 4 have lengths different from each other (since length of the optical path differs among different channels), where it is necessary for the optical wirings (optical paths) to be equal to each other, the optical fiber array 6 is connected while twisted by 180 degrees between the two optical modules such that the longest one of the curved waveguides 4 of one of the optical modules and the shortest one of the curved waveguides 4 of the other one of the optical modules are connected to each other.

Now, a fabrication method for the optical module (multi-channel optical transceiver) according to the present embodiment is described with reference to FIGS. 8(A) to 8(D) and 9(A) to 9(D).

First, the waveguide block 5 which includes the plural curved waveguides (in-plane curved waveguides) 4 formed on a plane can be fabricated, for example, in such a manner as described below.

Figure 8A:
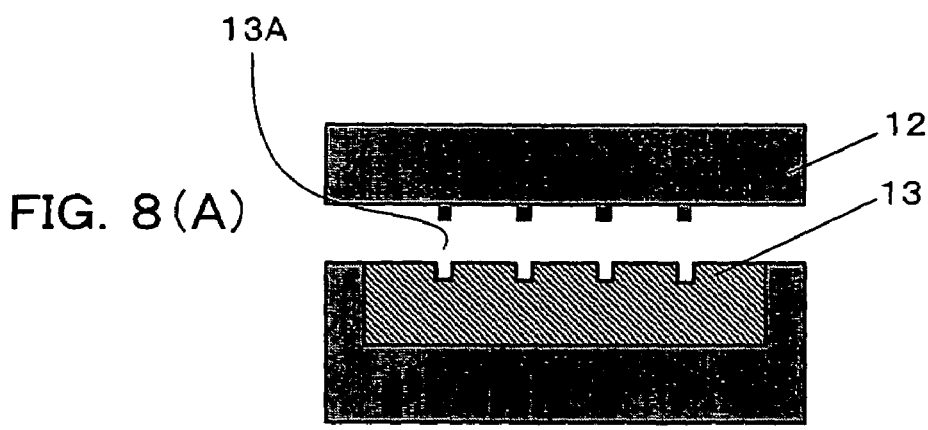
FIGS. 8(A) to 8(D) are schematic views illustrating a fabrication method of the waveguide block provided in the optical module according to the first embodiment of the present invention.

A metal mold (molding metal mold) 12 having a waveguide pattern of a convex shape (here, a pattern for forming a plurality of curved waveguides) as shown in FIG. 8(A) is fabricated.

Then, olefin resin 13 (for example, a refractive index n=1.52 after cured) to be used for formation of a lower cladding material is poured into the metal mold 12 to perform molding.

Figure 8B:
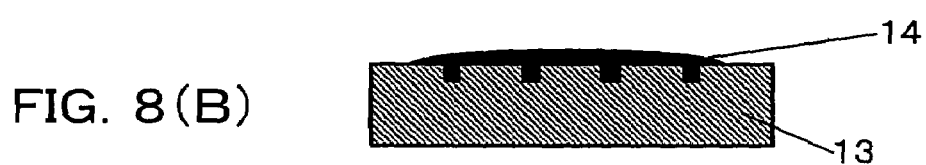
Figure 8C:
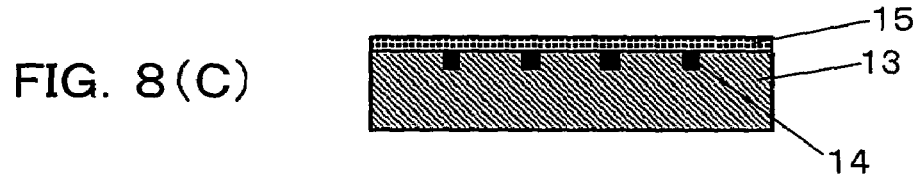

Then, epoxy resin 14 (for example, a refractive index n=1.54 after cured) of the ultraviolet curing type to be used for formation of waveguide cores is dropped (applied) into grooves 13A (waveguide grooves) of the molded member 13 in the form of a plate made of the transparent olefin resin as seen in FIG. 8(B). Then, a film 15 (cladding film; refractive index n=1.52; for example, 0.1 mm thick) of olefin resin prepared separately is stuck as seen in FIG. 8(C).

Figure 8D:
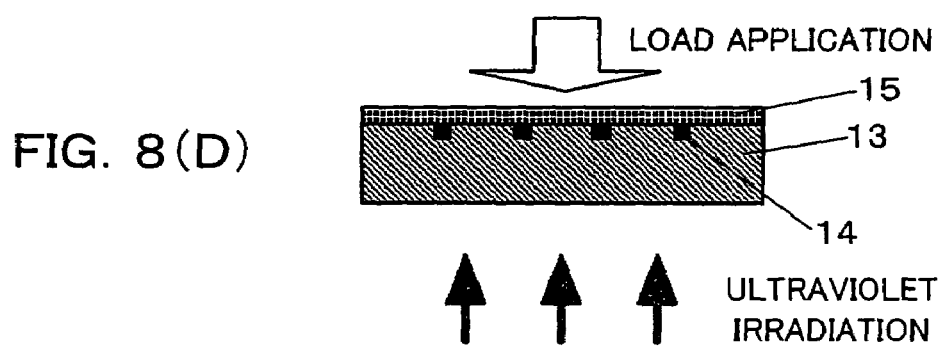

Then, ultraviolet rays are irradiated while a load is applied to cure the epoxy resin 14 as seen in FIG. 8(D).

Thereafter, the end faces are mirror polished to fabricate a waveguide block 5 (waveguide block formed from a molded member in the form of a flat plate) having curved waveguides 4 (here, eight curved waveguides) formed on a plane as seen in FIG. 9(B).

Here, the outside dimension of the waveguide block 5 is 10 mm×10 mm×5 mm. The dimension of the waveguide cores which form the curved waveguides 4 is 0.05 mm×0.05 mm. Of the eight curved waveguides 4, the left side four curved waveguides 4 in FIG. 9(B) are the light emitting device curved waveguides (transmission curved waveguides) 4A to be optically connected to the planar light-emitting device array (VCSEL array) 2, and the pitch of the waveguide cores which form the light emitting device curved waveguides 4A is 0.25 mm. Meanwhile, of the eight curved waveguides 4, the right side four curved waveguides 4 in FIG. 9(B) are photo-detector curved waveguides (reception curved waveguides) 4B to be optically connected to the photo-detector array (PD array) 3, and the pitch of the waveguide cores which form the reception curved waveguides 4B is 0.25 mm. Further, the pitch between the waveguide cores which form the transmission curved waveguides 4A and the waveguide cores which form the reception curved waveguides 4B is 1.00 mm on the end face 5A of the waveguide block 5 (on the end face on the side of the waveguide block 5 to be optically connected to the VCSEL array 2 and the PD array 3), but is 0.25 mm on the other end face 5B orthogonal to the end face 5A (on the end face on the side of the waveguide block 5 to be optically connected to the optical fiber array 6). Thus, the pitch is converted.

Meanwhile, the planar light emitting device array (VCSEL array) 2 and the photo-detector array (PD array) 3 are mounted in advance on the printed board 1 (device mounting board) as seen in FIG. 9(A). In particular, the planar light emitting device array 2 and the planar photo-detector array 3 are stuck to the printed board 1 using conductive paste with a heat radiating block 16 (heat spreader: for example, 0.25 mm thick), for example, of a copper tungsten alloy interposed therebetween such that the light emitting faces of a plurality of planar light emitting lasers which form the planar light emitting laser array 2 and the light receiving faces (incidence faces) of a plurality of photo-detectors which form the planar photo-detector array 3 are directed upwardly in a direction perpendicular to the printed board 1 and the planar light emitting lasers and the photo-detectors line up on a straight line.

It is to be noted that the distance between the planar light emitting laser array 2 and the photo-detector array 3 (gap between the two chips) is set to 1 mm although it may be an arbitrary one. Further, though not shown, electrodes on the surface of the chips and wirings on the printed board may be connected to each other by wire bonding so that they may serve as feeder lines.

Here, a multi-mode 4-channel array of a wavelength of, for example, 850 nm is used as the planar light emitting laser array 2. The array pitch is 0.25 mm, and the outside dimension is 1.0 mm×0.25 mm×0.25 mm.

Further, a 4-channel array of a wavelength of, for example, 850 nm is used as the photo-detector array 3. The array pitch is 0.25 mm, and the outside dimension is 1.0 mm×0.25 mm×0.25 mm.

On the printed board 1 fabricated in this manner and having the chips mounted thereon, the waveguide block 5 fabricated in such a manner as described above is mounted with spacers 17 (for example, 0.6 mm thick) interposed therebetween. For example, the waveguide block 5 may be fixed to the printed board 1 using ultraviolet curing resin.

Thereupon, for example, a flip chip bonder having a vertical visual field camera may be used to perform positioning so that the centers of the waveguide cores which form the curved waveguides 4 provided on the waveguide block 5 may be aligned with the centers of the light receiving faces of the photo-detectors and the centers of the light emitting faces of the planar light emitting lasers.

After the waveguide block 5 including the curved waveguides 4 (in-plane curved waveguides) curved in a plane was fabricated using polymer and was mounted on the printed board 1 together with the planar light emitting laser array 2 and the planar photo-detector array 3 to fabricate a multi-channel optical transceiver as an optical module in this manner, the optical fiber array 6 was assembled and the insertion loss of the curved waveguides 4 which form the waveguide block 5 was measured in order to evaluate the transmission and reception performances as seen in FIG. 9(C). According to a result of the measurement, the insertion loss was 2.0±0.3 dB including the coupling loss by coupling to the chips 2 and 3, and the variation in insertion loss among channels is little. Thus, it was confirmed successfully that the pitch conversion by the waveguide block 5 fabricated in such a manner as described above is effective.

It is to be noted that the optical fiber array 6 was connected to the end face of the waveguide block 5 mounted on the printed board 1 through the optical connector (fiber connector) 10 as shown in FIG. 9(C). Thereupon, electric current was supplied to the face light emitting lasers to perform positioning by active alignment.

Accordingly, with the optical module, optical transceiver, optical transmission system and fabrication method for an optical module according to the present embodiment, there is an advantage that optical connection between the planar optical devices [for example, face light emitting lasers, photodiodes (photo-detectors) and so forth] mounted on the printed board 1 and the optical fibers attached in parallel to the printed board 1 can be implemented simply and readily.

It is to be noted that, while, in the present embodiment, the optical module of the present invention is described taking a multi-channel optical transceiver as an example, the optical module of the present invention is not limited to this, but the present invention can be applied widely to any optical module only if it requires optical connection between a planar optical device [for example, a planar light emitting laser, a photodiode (photo-detector) or the like] mounted on a board and an optical fiber attached in parallel to the board.

Second Embodiment

Now, an optical module, an optical transceiver and a fabrication method for an optical module according to the second embodiment of the present invention is described with reference to FIGS. 10 to 17, 18(A) to 18(E) and 19(A) to 19(C).

The optical module according to the present embodiment is different from the multi-channel optical transceiver of the first embodiment described hereinabove in the structure for making wavelength division multiplexing transmission possible. In particular, the optical module according to the present embodiment is different in that it is a wavelength division multiplexing multi-channel optical transceiver (optical transmitter, optical receiver) which is based on a thin film channel waveguide and has a structure (CWDM structure) which permits wavelength division multiplexing transmission which makes use of a demultiplexing and multiplexing technique.

In the following, an optical transmitter which can be used to form a wavelength division multiplexing multi-channel optical transceiver is described with reference to FIGS. 10 to 12, 13(A) to 13(C) and 14(A) to 14(C). Thereafter, an optical receiver which can be used to form a wavelength division multiplexing multi-channel optical receiver is described with reference to FIGS. 15 to 17, 18(A) to 18(E) and 19(A) to 19(C). Finally, a wavelength division multiplexing optical transceiver is described. It is to be noted that, in FIGS. 10 to 17, 18(A) to 18(E) and 19(A) to 19(C), like elements to those of the first embodiment (refer to FIG. 1) described hereinabove are denoted by like reference characters.

[Optical Transmitter]

Figure 10:
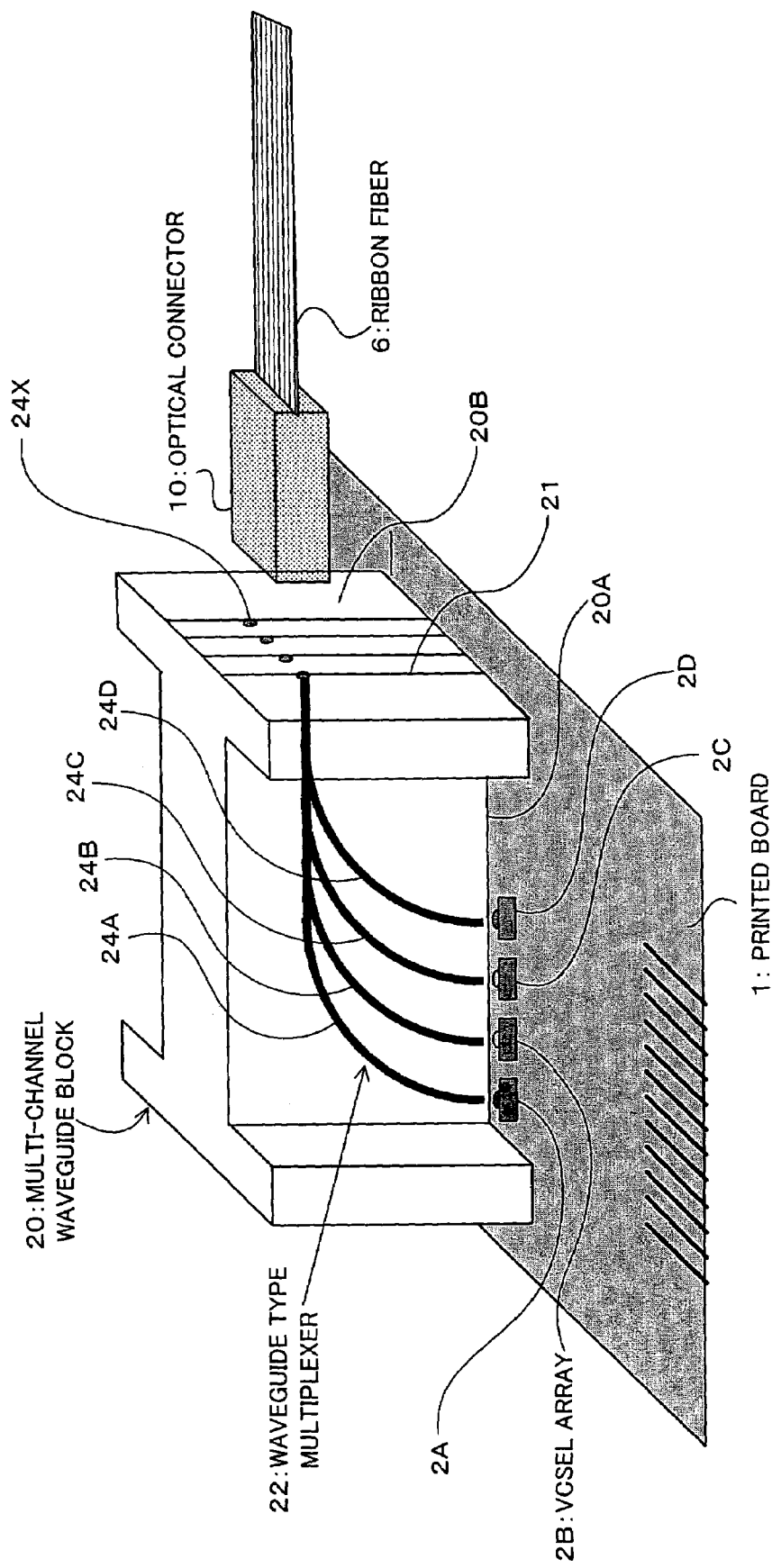
FIG. 10 is a schematic view showing a configuration of an optical transmitter as an optical module according to a second embodiment of the present invention.

First, the optical transmitter according to the present embodiment includes, for example, as shown in FIG. 10, planar light emitting device arrays 2A to 2D (VCSEL array chips) each formed from a plurality of planar light emitting devices [here, planar light emitting lasers; VCSELs (Vertical-Cavity Surface-Emitting lasers)] having an emitting face on the surface thereof, and a transmitter waveguide block 20 (waveguide array) formed from a plurality of transmitter film waveguides 21 laminated with each other and each including a waveguide type multiplexer 22 which in turn includes a plurality of curved waveguides 24A to 24D.

The waveguide type multiplexer 22 is formed such that a plurality of curved waveguides 24A to 24D are overlapped with each other on one end side thereof such that lights having propagated along the curved waveguides 24A to 24D are multiplexed on the one end side. Here, a multi-channel multiplexer is formed by a plurality of film waveguides 21 laminated with each other.

Meanwhile, the transmitter waveguide block 20 is formed such that a plurality of film waveguides 21 are laminated with each other in such a manner that end faces 24X of the curved waveguides 24A to 24D on the side on which the curved waveguides 24A to 24D are overlapped with each other line up individually in series and in parallel to each other along the surface of the printed board 1 as seen in FIG. 10. The multi-channel waveguide block 20 is configured by disposing the film waveguides 21 in multiple layers in this manner, and a multi-channel optical transmitter is implemented thereby. Then, to the end faces 24X on the side on which the curved waveguides 24A to 24D are overlapped, an optical fiber array (ribbon fiber) 6 formed from a plurality of optical fibers is connected through the optical connector 10, as seen in FIG. 10.

Therefore, by setting the thickness of the transmitter film waveguides 21 (that is, the distance between the waveguide cores which form the curved waveguides of the transmitter film waveguides 21) to a thickness (distance) corresponding to the fiber pitch of the optical fiber array 6, conversion of the pitch into an arbitrary optical fiber pitch can be implemented irrespective of the mounting gap (chip distance) between the planar light emitting device arrays (even if the plural planar light emitting device arrays are disposed at an arbitrary distance) similarly as in the first embodiment described hereinabove. Consequently, the degree of freedom in design is enhanced, and it can be prevented that part of an optical fiber array becomes wasteful.

Further, the planar light emitting device arrays 2A to 2D include a plurality of planar light emitting devices having same light emitting wavelengths as each other. The planar light emitting device arrays 2A to 2D are disposed in parallel to each other on the printed board 1 such that the emitting faces of the planar light emitting devices are directed upwardly and perpendicularly to the printed board 1 and besides the planar light emitting devices line up in series along the lamination direction of the transmitter film waveguides 21.

Figure 11:
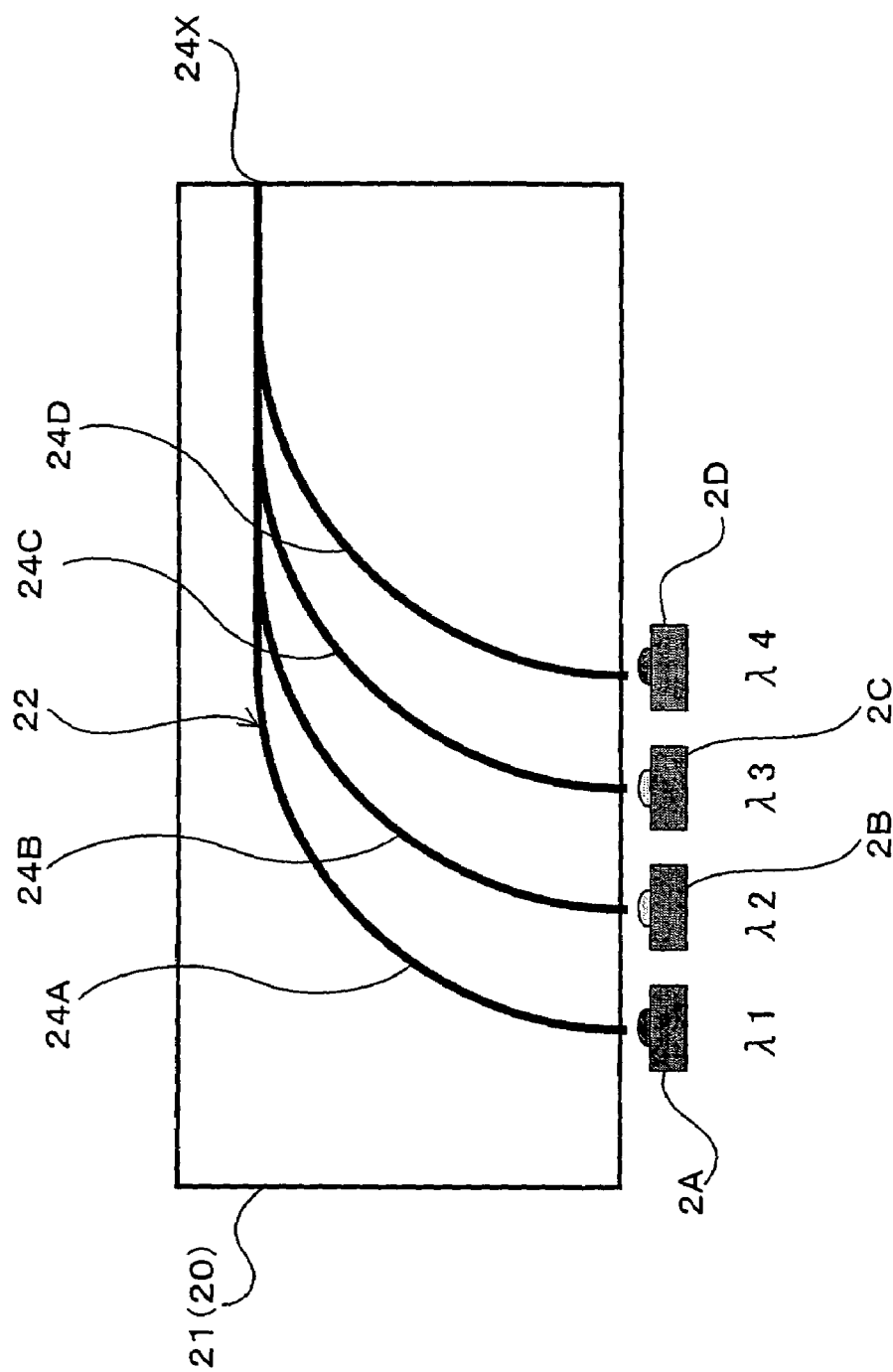
FIG. 11 is a schematic view showing a configuration of a transmitter film waveguide provided in the optical transmitter as an optical module according to the second embodiment of the present invention.

In the present embodiment, a plurality of planar light emitting devices having different light emitting wavelengths from each other are mounted on the printed board 1 such that they line up in series along an end face of the transmitter waveguide block 20 (laminated transmitter film waveguides 21) as seen in FIG. 11.

Figure 12:
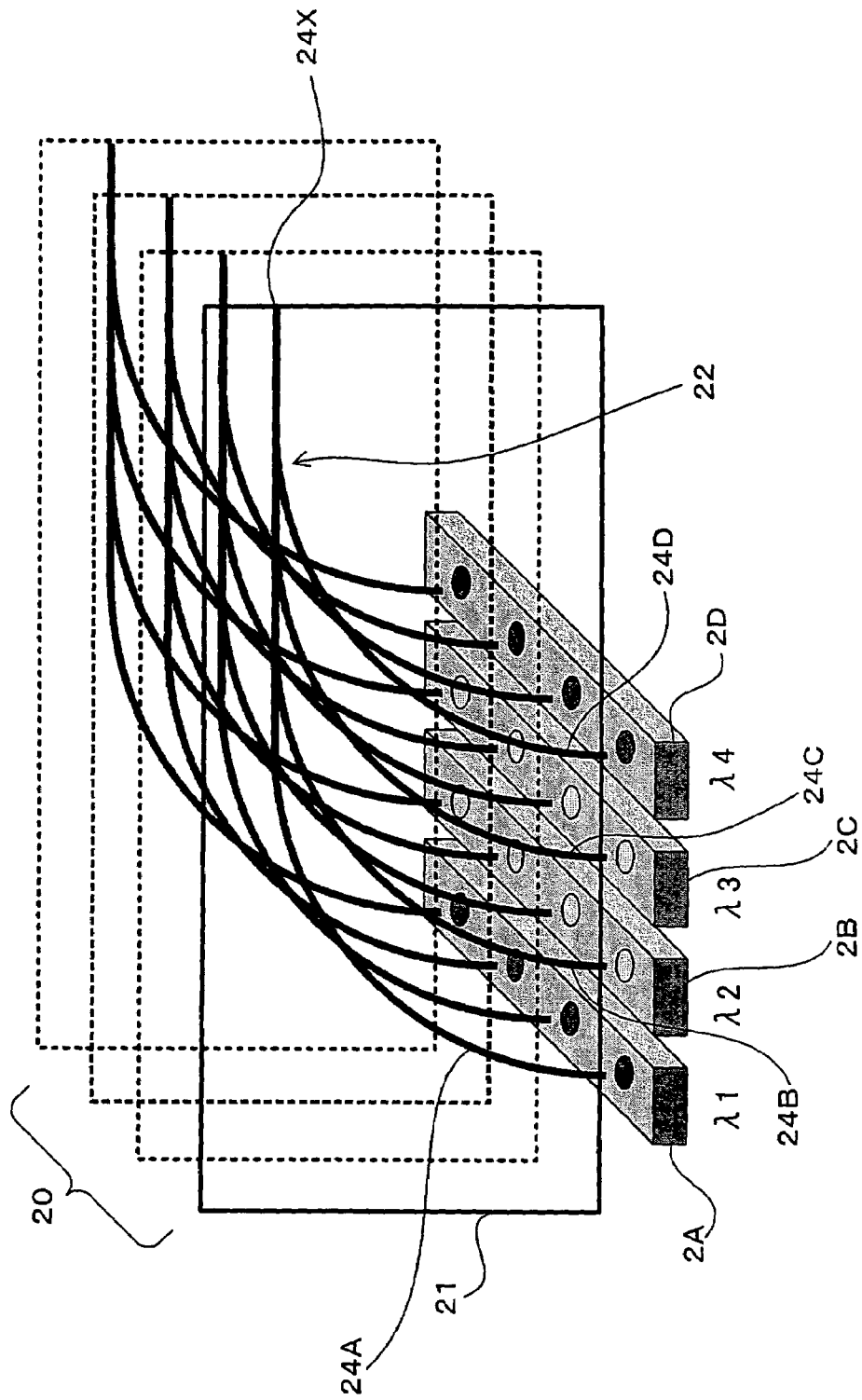
FIG. 12 is a schematic view showing a configuration of a transmitter waveguide block and a planar light emitting device array provided in the optical transmitter as an optical module according to the second embodiment of the present invention.

In particular, as seen in FIG. 12, a first planar light emitting device array 2A formed from a plurality of first planar light emitting devices of a light emitting wavelength $\lambda 1$, a second planar light emitting device array 2B formed from a plurality of second planar light emitting devices of a light emitting wavelength $\lambda 2$, a third planar light emitting device array 2C formed from a plurality of third planar light emitting devices of a light emitting wavelength $\lambda 3$, and a fourth planar light emitting device array 2D formed from a plurality of fourth planar light emitting devices of a light emitting wavelength $\lambda 4$ are mounted on the printed board 1 such that they line up individually in series along an end face of the transmitter waveguide block 20 (laminated transmitter film waveguides 21) and in parallel to each other.

In the present embodiment, the curved waveguides 24A to 24D are formed as a transmitter film waveguide 21 and are channel waveguides formed on a plane. Therefore, the degree of freedom in fabrication method is high, and the curved waveguides 24A to 24D can be fabricated readily by a molding method which is based on a plane metal mold formed, for example, by an electroformed replica. Further, since the channel waveguides are adopted, a beam can be confined to a width of, for example, approximately 50 μm, and therefore, miniaturization of the module can be anticipated. Furthermore, since the optical paths are produced in a two-dimensional plane first, the curved waveguides 24A to 24D are superior in terms of positioning and reliability (impact resistance) when compared with an alternative case where in spatial light is used. Further, since the curved waveguides 24A to 24D are formed on a plane, they can be molded using a simple embossing technique, and therefore, the cost is low. It is to be noted that a particular formation method of the curved waveguides 24A to 24D is hereinafter described.

Further, in the present embodiment, the curved waveguides 24A to 24D which form the waveguide type multiplexer 22 are optically connected to respective ones of a plurality of planar light emitting devices on an end face 20A of the transmitter waveguide block 20, and are optically connected to optical fibers on the other end face 20B of the transmitter waveguide block 20 orthogonal to the end face 20A as seen in FIG. 10.

Consequently, as seen in FIG. 10, lights of different wavelengths emitted from the emitting faces of a plurality of planar light emitting devices of different light emitting devices are optically coupled to the curved waveguides 24A to 24D provide on the transmitter waveguide block 20, and the optical paths of the lights are curved substantially to the right angle in the plane. Then, the lights are multiplexed into wavelength division multiplexed light, which is optically coupled to the optical fibers through the optical connector 10.

In the present embodiment, since the optical transmitter includes a plurality of planar light emitting devices having same light emitting wavelengths as each other and the transmitter waveguide block 20 is structured such that a plurality of transmitter film waveguides 21 having the same configuration are laminated and besides the optical fiber array 6 formed from a plurality of optical fibers is connected to the transmitter waveguide block 20, wavelength division multiplexed lights (multi-channel wavelength division multiplexed lights) multiplexed by the plurality of the waveguide type multiplexer 22 of the same configuration are emitted to respective ones of the plural optical fibers.

Now, a fabrication method for the optical transmitter (optical module) which form the wavelength division multiplexing multi-channel optical transceiver according to the present embodiment is described with reference to FIGS. 13(A) to 13(C) and 14(A) to 14(C).

First, the transmitter waveguide block 20 which includes the curved waveguides 24A to 24D (in-plane curved waveguides) formed in planes can be fabricated, for example, in such a manner as described below. It is to be noted that, in FIGS. 13(A) to 13(C), only two curved waveguides are shown for the convenience of illustration.

A metal mold for a transmitter (molding metal mold) having a convex-shaped transmitter waveguide pattern (here, a pattern for formation of a plurality of curved waveguides) is fabricated.

Then, olefin resin (for example, a refractive index n=1.52 after cured) used to form a lower cladding material is poured into the metal mold to perform molding. Consequently, a film-like molded body 25 made of the transparent olefin resin is formed as seen in FIG. 13(A).

Then, epoxy resin 26 (for example, a refractive index n=1.54 after cured) of the ultraviolet curing type used to form a waveguide core is filled (applied) into grooves (waveguide grooves) 25A of the film-like molded body 25 as seen in FIG. 13(B). Then, a film 27 (cladding film; refractive index n=1.52; 0.1 mm thick) of olefin resin prepared separately is stuck as seen in FIG. 13(C).

Then, ultraviolet rays are irradiated while a load is applied to cure the epoxy resin 26.

Thereafter, the end faces are mirror polished to produce a transmitter film waveguide 21 having curved waveguides 24A to 24D formed on a plane as seen in FIG. 11. Then, a plurality of such transmitter film waveguides 21 of the same configuration fabricated in such a manner as described above are laminated to fabricate a transmitter waveguide block 20 as seen in FIG. 12.

Here, the outside dimension of the transmitter waveguide block 20 is 10 mm×5 mm×5 mm. The dimension of the waveguide cores 26 which form the curved waveguides 24A to 24D is 0.05 mm×0.05 mm.

Then, an optical transmitter (transmission module) which includes the transmitter waveguide block 20 fabricated in such a manner as described above can be fabricated, for example, in the following manner.

Figure 14A:
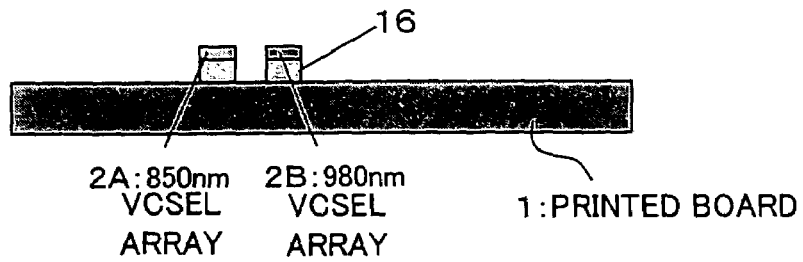
FIGS. 14(A) to 14(C) are schematic views illustrating a fabrication method of the optical module (optical transmitter) according to the second embodiment of the present invention.

A plurality of (here, two) planar light emitting laser arrays 2A and 2B are mounted in advance on the printed board 1 as seen in FIG. 14(A). In particular, the planar light emitting laser arrays 2A and 2B are stuck to the printed board 1 using conductive paste with heat radiating blocks 16 (for example, a thickness of 0.25 mm) of copper tungsten alloy interposed therebetween such that the light emitting faces (emitting faces) of a plurality of planar light emitting lasers which form the planar light emitting laser arrays 2A and 2B are directed upwardly in a direction perpendicular to the printed board 1 and the planar light emitting laser arrays 2A and 2B line up in parallel to each other.

It is to be noted that the distance between the planar light emitting laser array 2A and the planar light emitting laser array 2B (gap between the two chips) may be an arbitrary distance and may be, for example, 1 mm. Further, the electrodes on the surface of the chips and the wirings on the printed board are coupled to each other by wire bonding so that they may serve as feeder lines.

Here, two different multi-mode planar light emitting laser arrays 2A and 2B of wavelengths 850 nm and 980 nm are used. The outside dimension of the planar light emitting laser arrays 2A and 2B is 0.25 mm×0.25 mm×0.25 mm.

Figure 14B:
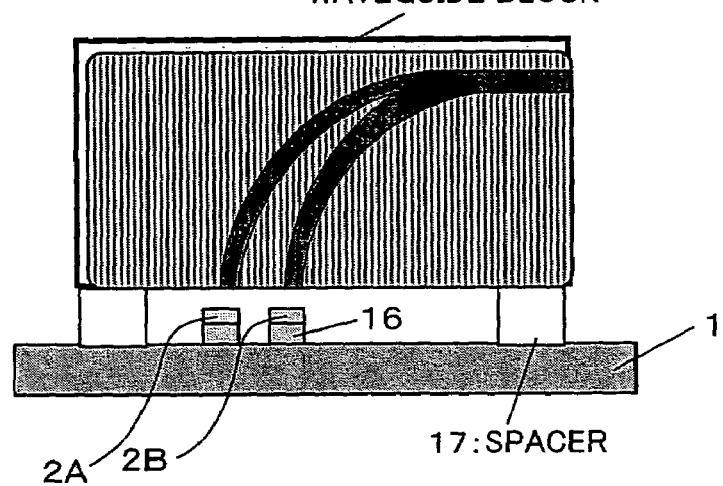

The transmitter waveguide block (transmission side waveguide block) 20 fabricated in such a manner as described above is mounted on the printed board 1 fabricated in such a manner as described above and having the chips mounted thereon with the spacers 17 (for example, a thickness of 0.6 mm) interposed therebetween as seen in FIG. 14(B). For example, the transmitter waveguide block 20 may be fixed to the printed board 1 using ultraviolet curing resin.

Thereupon, for example, a flip chip bonder having a vertical visual field camera may be used to perform positioning so that the centers of the waveguide cores which form the curved waveguides 24A to 24D provided on the transmitter waveguide block 20 may individually be aligned with the centers of the light emitting faces of the planar light emitting lasers.

[Optical Receiver]

Figure 15:
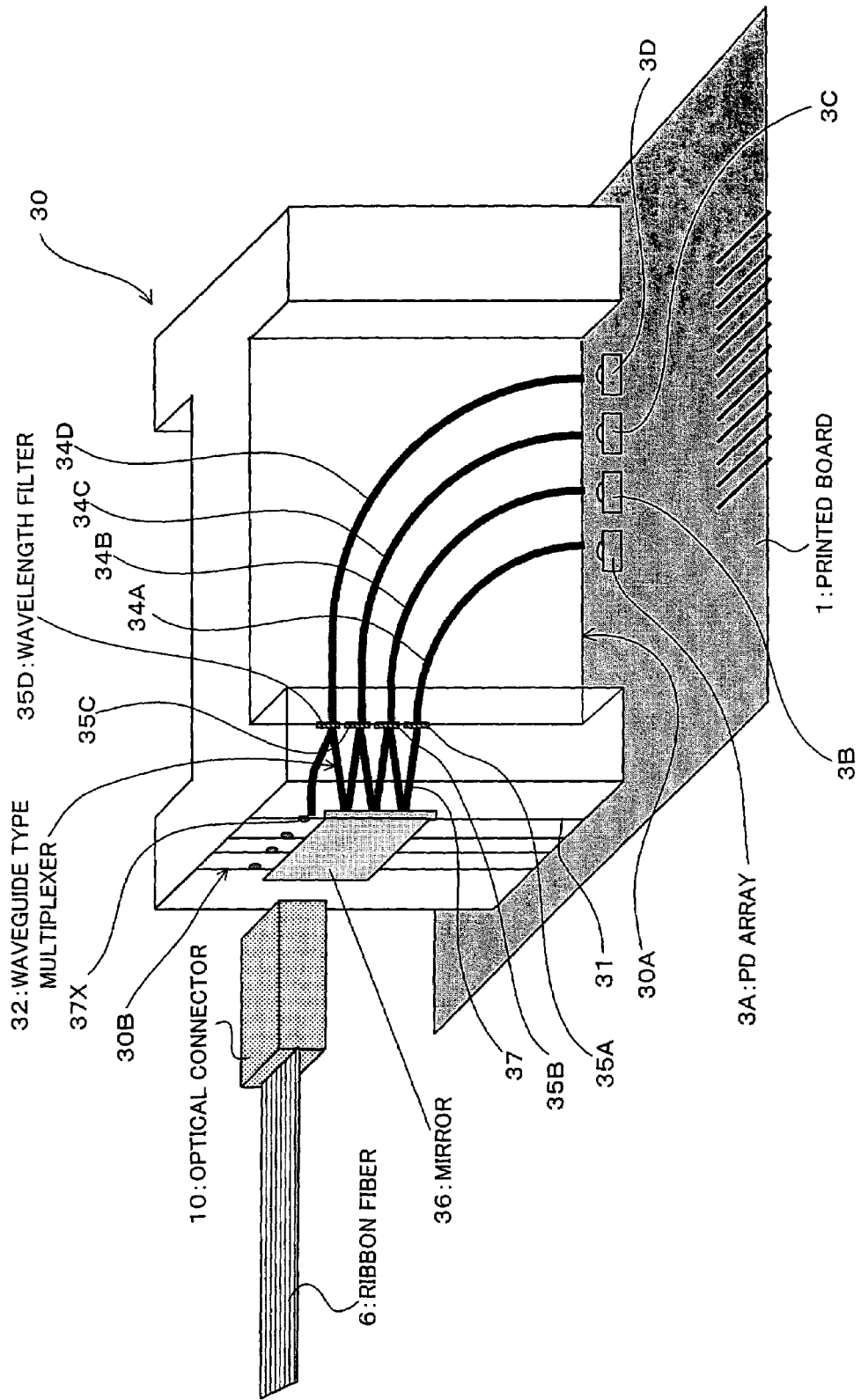
FIG. 15 is a schematic view showing a configuration of an optical receiver as an optical module according to the second embodiment of the present invention.

Now, the optical receiver according to the present embodiment includes, for example, as shown in FIG. 15, planar photo-detector arrays (PD array chips) 3A to 3D each formed from a plurality of planar photo-detectors [here, photo-diodes (photo-detectors; PDs)]; having an incidence face on the surface thereof, and a receiver waveguide block (waveguide array) 30 formed from a plurality of receiver film waveguides 31 laminated with each other and each including a plurality of (here, four) curved waveguides 34A to 34D and a waveguide type demultiplexer 32.

Figure 16:
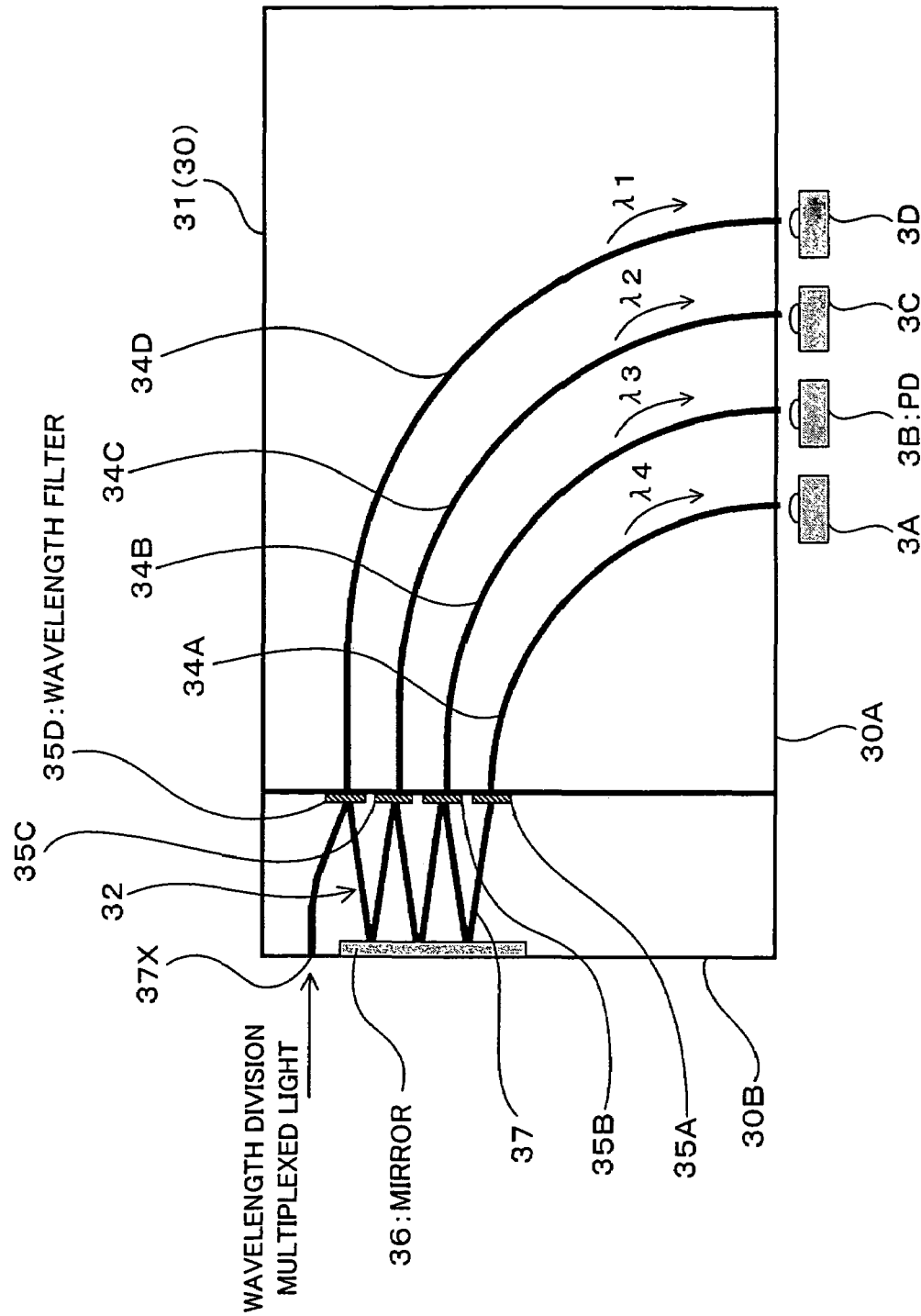
FIG. 16 is a schematic view showing a configuration of a receiver film waveguide provided in the optical receiver as an optical module according to the second embodiment of the present invention.

Referring to FIG. 16, the waveguide type demultiplexer 32 includes a plurality of (here, four) wavelength filters 35A to 35D connected to the plural curved waveguides 34A to 34D, a mirror 36 provided at an end face of the receiver waveguide block 30 (laminated receiver film waveguides 31), and channel waveguides 37 formed between the wavelength filters 35A to 35D and the mirror 36. The waveguide type demultiplexer 32 demultiplexes wavelength division multiplexed light incoming through an incidence side end face 37X of the channel waveguides 37 into lights of different wavelengths and emits the lights to the curved waveguides 34A to 34D. Here, a plurality of film waveguides 31 are laminated to form a multi-channel demultiplexer.

In the present embodiment, a thin film filter formed as a horizontally elongated chip part is used for the wavelength filters 35A to 35D. Here, an n-channel common use chip is used for the wavelength filters 35A to 35D, and the wavelength filters 35A to 35D are mounted in such a manner as to extend through a plurality of laminated receiver film waveguides 31 to share the parts among the different channels. Further, each of the wavelength filters 35A to 35D is configured so as to transmit light of only one wavelength therethrough but reflect lights of the other wavelengths. Here, the wavelength filters 35A to 35D transmit lights of different wavelengths from one another.

The waveguide type demultiplexer 32 configured in such a manner as described above demultiplexes lights of different wavelengths included in wavelength division multiplexed light in the following manner.

In particular, as seen in FIG. 16, only light having the first wavelength λ1 included in wavelength division multiplexed light incoming through the incidence side end face 37X of the channel waveguides 37 passes through and is demultiplexed by the first wavelength filter 35D and is then introduced to the first curved waveguide 34D.

On the other hand, the remaining wavelength division multiplexed light is reflected by the first wavelength filter 35D, guided by a channel waveguide 37 and then reflected by the mirror 36, whereafter it is guided by another channel waveguide 37. Thus, only light having the second wavelength λ2 passes through and is demultiplexed by the second wavelength filter 35C and is introduced to the second curved waveguide 34C.

Further, the remaining wavelength division multiplexed light is reflected by the second wavelength filter 35C, guided by a channel waveguide 37, reflected by the mirror 36 and then introduced by another channel waveguide 37. Thus, only light having the third wavelength λ3 passes through and is demultiplexed by the third wavelength filter 35B and is introduced to the third curved waveguide 34B.

Then, the remaining light having the fourth wavelength λ4 is reflected by the third wavelength filter 35B, guided by a channel waveguide 37, reflected by the mirror 36 and further guided by another channel waveguide 37. Thus, the light passes through and is demultiplexed by the fourth wavelength filter 35A and is introduced to the fourth curved waveguide 34A.

It is to be noted that, although, in the waveguide type demultiplexer 32 configured in such a manner as described above, an optical path length difference appears between different wavelengths, the optical path length difference can be eliminated by the design of the curved waveguides 34A to 34D, and it is possible to achieve equalization of the optical path lengths for the individual wavelengths. Further, where the waveguide type demultiplexer 32 is connected to the optical transmitter which includes the curved waveguides 24A to 24D described hereinabove, the optical path length difference can be eliminated also by the design of the curved waveguides 24A to 24D of the optical transmitter.

Figure 17:
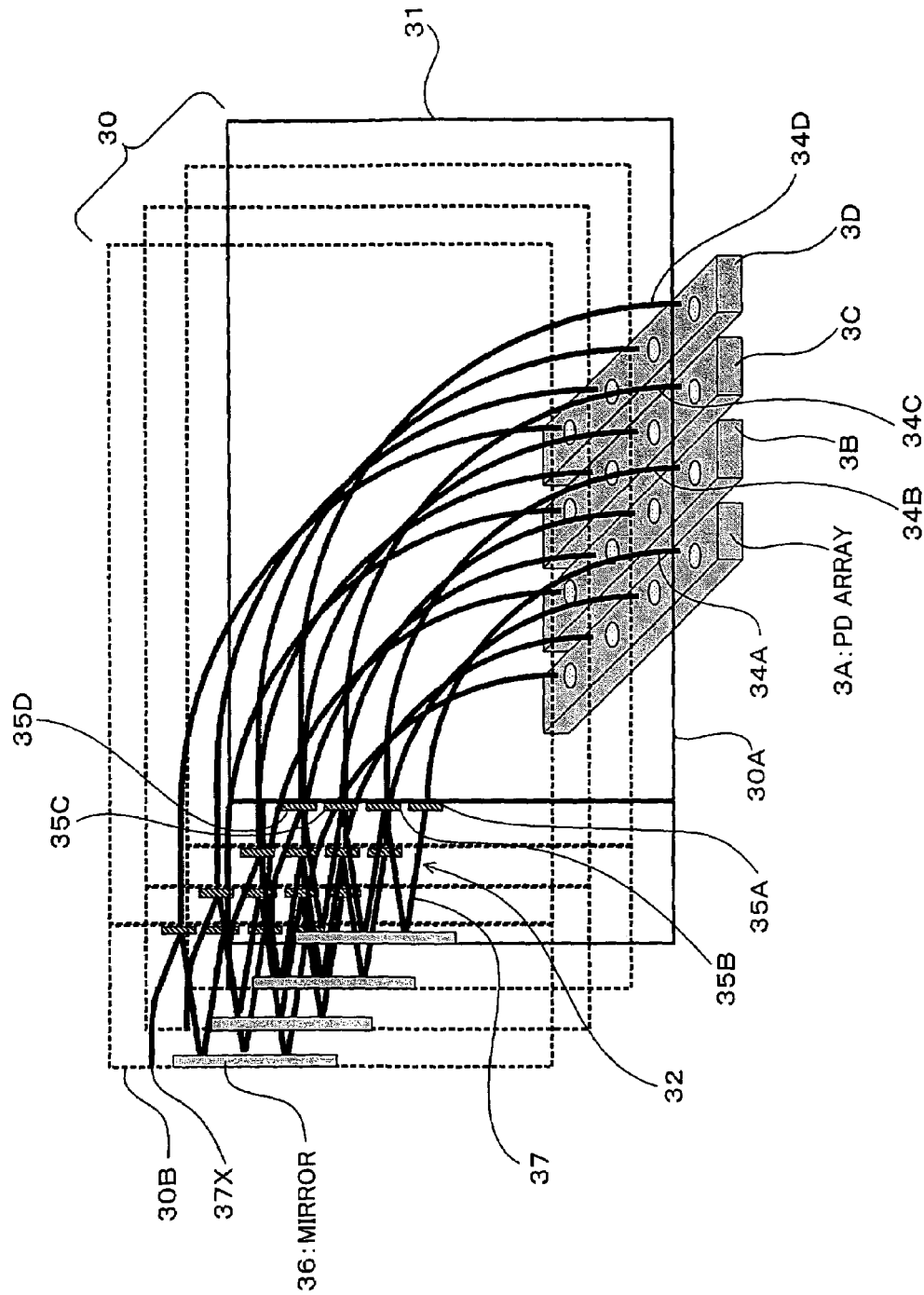
FIG. 17 is a schematic view showing a configuration of a receiver waveguide block and a planar photo-detector array provided in the optical receiver as an optical module according to the second embodiment of the present invention.

Meanwhile, the receiver waveguide block 30 is formed from a plurality of receiver film waveguides 31 laminated such that, as shown in FIG. 17, incidence side end faces 37X of the channel waveguides 37 line up individually in series along the surface of the printed board 1 and in parallel to each other. The receiver waveguide block 30 is configured to implement a multi-channel optical receiver by laminating the receiver film waveguides 31 in this manner. Further, an optical fiber array 6 (ribbon fiber) formed from a plurality of optical fibers is connected to the incidence side end faces 37X of the plural channel waveguides 37 through the optical connector 10 as seen in FIG. 15.

By setting the thickness of the film waveguides 31 (that is, the distance between the waveguide cores which form the curved waveguides of the receiver film waveguides 31) so as to be equal to a thickness (distance) corresponding to the fiber pitch of the optical fiber array 6, the block 30 can convert the mounting gap (chip distance) between the planar light emitting device arrays into an arbitrary optical fiber pitch irrespective of the mounting gap (even if the plural planar light emitting device arrays are disposed in a spaced relationship by an arbitrary distance from each other) similarly as in the first embodiment described hereinabove. Consequently, the degree of freedom in design is enhanced, and such a situation that part of an optical fiber array becomes wasteful can be prevented.

Further, each of the planar photo-detector arrays 3A to 3D includes a plurality of planar light photo-detectors as seen in FIG. 17. The planar photo-detector arrays 3A to 3D are disposed in parallel to each other on the printed board 1 such that the incidence faces of the planar photo-detectors are directed upwardly in a direction perpendicular to the printed board 1 and besides the planar photo-detectors line up in series along the lamination direction of the receiver film waveguides 31.

In the present embodiment, a plurality of planar photo-detectors which form the different planar photo-detector arrays 3A to 3D are mounted on the printed board 1 in such a manner as to line up in series along an end face of the receiver waveguide block 30 (laminated receiver film waveguides 31) as seen in FIG. 17.

In particular, as seen in FIG. 17, a first planar photo-detector array 3A formed from a plurality of first planar photo-detectors, a second planar photo-detector array 3B formed from a plurality of second planar photo-detectors, a third planar photo-detector array 3C formed from a plurality of third planar photo-detectors, and a fourth planar photo-detector array 3D formed from a plurality of fourth planar photo-detectors are mounted on the printed board 1 such that they line up individually in series along an end face of the receiver waveguide block 30 (laminated receiver film waveguides 31) and in parallel to each other.

In the present embodiment, the plural curved waveguides 34A to 34D are formed individually as the film waveguides 31 and are channel waveguides formed on a plane. Therefore, the degree of freedom in fabrication method is high, and the curved waveguides 34A to 34D can be fabricated readily by a molding method which is based on a plane metal mold fabricated, for example, using an electroformed replica. Further, since the channel waveguides are adopted, a beam can be confined to a width of, for example, approximately 50 μm, and therefore, miniaturization of the module can be anticipated. Furthermore, since the optical paths are produced in a two-dimensional plane first, the curved waveguides 34A to 34D are superior in terms of positioning and reliability (impact resistance) when compared with an alternative case wherein spatial light is used. Further, since the curved waveguides 34A to 34D are formed on a plane, they can be molded with a simple embossing technique, and therefore, the cost is low. It is to be noted that a particular formation method of the curved waveguides 34A to 34D is hereinafter described.

Further, as seen in FIG. 15, in the present embodiment, the curved waveguides 34A to 34D are optically connected to respective ones of a plurality of planar photo-detectors on an end face 30A of the receiver waveguide block 30. Meanwhile, the curved waveguides 34A to 34D are connected at the other ends thereof to a waveguide type demultiplexer 32. Further, on the other end face 30B of the receiver waveguide block 30 orthogonal to the end face 30A, an optical fiber is connected to the incidence side end face 37X of the channel waveguides 37 which form the waveguide type demultiplexer 32.

Consequently, as seen in FIG. 15, wavelength division multiplexed light introduced along the optical fiber is optically coupled to the incidence side end face 37X of the channel waveguides 37 which form the waveguide type demultiplexer 32. Then, when the wavelength division multiplexed light is guided by the channel waveguides 37, it is filtered and demultiplexed into lights of different wavelengths by the wavelength filters 35A to 35D. The lights of the different wavelengths are guided by the curved waveguides 34A to 34D, which curve the optical paths substantially to the right angle in a plane until they are optically coupled to the respective planar photo-detectors.

In the present embodiment, since the optical transmitter includes a plurality of planar photo-detectors and the receiver waveguide block 30 is structured such that a plurality of receiver film waveguides 31 having the same configuration are laminated and besides the optical fiber array 6 formed from a plurality of optical fibers is connected to the receiver waveguide block 30, wavelength division multiplexed lights (multi-channel wavelength division multiplexed lights) introduced from the plural optical fibers are demultiplexed by the plural waveguide type demultiplexer 32 of the same configuration and emitted to respective ones of the plural planar photo-detectors through the plural curved waveguides 34A to 34D.

Now, a fabrication method for the optical receiver (optical module) which forms the wavelength division multiplexing multi-channel optical transceiver according to the present embodiment is described with reference to FIGS. 18(A) to 18(E) and 19(A) to 19(C).

First, the receiver waveguide block 30 which includes the curved waveguides (in-plane curved waveguides) 34A to 34D formed in planes can be fabricated, for example, in such a manner as described below. It is to be noted that, in FIGS. 18(A) to 18(E), only two curved waveguides are shown for the convenience of illustration.

A metal mold for a receiver (molding metal mold) having a convex-shaped receiver waveguide pattern (here, a pattern for formation of a plurality of curved waveguides) is fabricated.

Then, olefin resin (for example, a refractive index n=1.52 after cured) used to form a lower cladding material is poured into the metal mold to perform molding. Consequently, a film-like molded body 38 made of the transparent olefin resin is formed as seen in FIG. 18(A).

Then, epoxy resin 39 (for example, a refractive index n=1.54 after cured) of the ultraviolet curing type used to form a waveguide core is filled (applied) into grooves (waveguide grooves) 38A of the film-like molded body 38 as seen in FIG. 18(B). Then, a film 40 (cladding film; refractive index n=1.52; 0.1 mm thick) of olefin resin prepared separately is stuck as seen in FIG. 18(C).

Then, ultraviolet rays are irradiated while a load is applied to cure the epoxy resin.

Thereafter, thin film filter inserting grooves are formed, and then narrow bandwidth wavelength filters 35 (35A to 35D), for example, for 980 nm are inserted into the grooves and fixed using a transparent adhesive as seen in FIG. 18(D).

Then, a mirror 36 is stuck to the end face, to which optical fibers are to be connected, for example, using a transparent adhesive as seen in FIG. 18(E).

Finally, the end faces are mirror polished to produce a film waveguide 31 having curved waveguides 34A to 34D formed on a plane as seen in FIG. 16. Then, a plurality of such receiver film waveguides 31 of the same configuration fabricated in such a manner as described above are laminated to fabricate a receiver waveguide block 30 as seen in FIG. 17.

Here, the outside dimension of the receiver waveguide block 30 is 10 mm×5 mm×5 mm. The dimension of the waveguide cores 39 which form the curved waveguides 34A to 34D is 0.05 mm×0.05 mm.

Then, an optical receiver (reception module) which includes the receiver waveguide block 30 fabricated in such a manner as described above can be fabricated, for example, in the following manner.

Figure 19A:
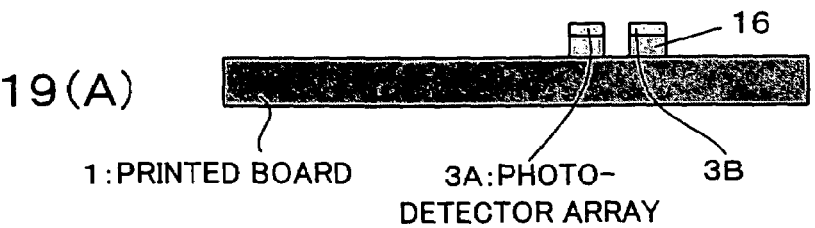
FIGS. 19(A) to 19(C) are schematic views illustrating a fabrication method of the optical module (optical receiver) according to the second embodiment of the present invention.

A plurality of (here, two) photo-detector arrays 3A and 3B are mounted in advance on the printed board 1 as seen in FIG. 19(A). In particular, the photo-detector arrays 3A and 3B are stuck to the printed board 1 by conductive paste with heat radiating blocks 16 (for example, a thickness of 0.25 mm), for example, of copper tungsten alloy interposed therebetween such that the light receiving faces (incidence faces) of a plurality of photo-detectors which form the photo-detector arrays 3A and 3B are directed upwardly in a direction perpendicular to the printed board 1 and the photo-detector arrays 3A and 3B line up in parallel to each other.

It is to be noted that the distance between the planar photo-detector array 3A and the planar photo-detector array 3B (gap between the two chips) may be an arbitrary distance and may be, for example, 1 mm. Further, the electrodes on the surface of the chips and the wirings on the printed board are coupled to each other by wire bonding so that they may be used as feeder lines.

Here, two different photo-detector arrays 3A and 3B having a sensitivity, for example, to wavelengths 850 to 980 nm are used. The outside dimension of the photo-detector arrays 3A and 3B is 0.25 mm×0.25 mm×0.25 mm.

Figure 19B:
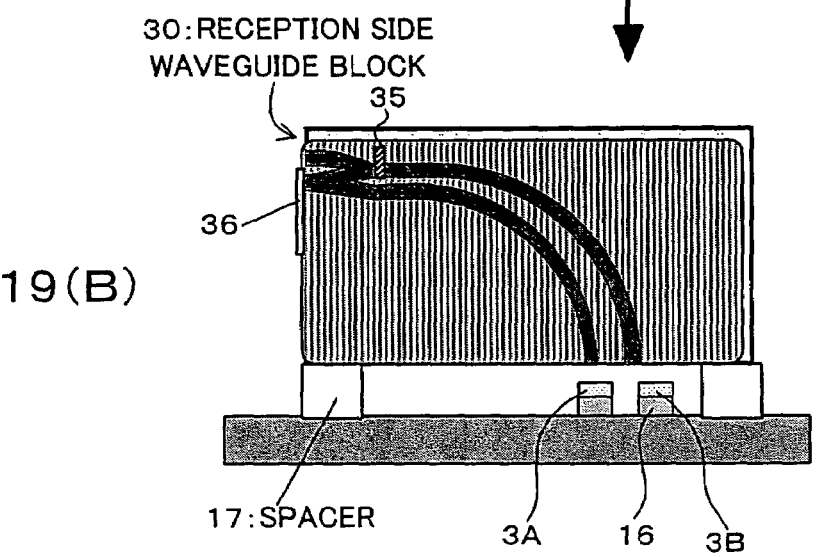

The receiver waveguide block (reception side waveguide block) 30 fabricated in such a manner as described above is mounted on the printed board 1 fabricated in such a manner as described above and having the chips mounted thereon with spacers 17 (for example, a thickness of 0.6 mm) interposed therebetween as seen in FIG. 19(B). For example, the receiver waveguide block 30 may be fixed to the printed board 1 using ultraviolet curing resin.

Thereupon, for example, a flip chip bonder having a vertical visual field camera may be used to perform positioning so that the centers of the waveguide cores which form the curved waveguides 34A to 34D provided on the receiver waveguide block 30 may individually be aligned with the centers of the light receiving faces of the photo-detectors.

[Evaluation]

Figure 14C:
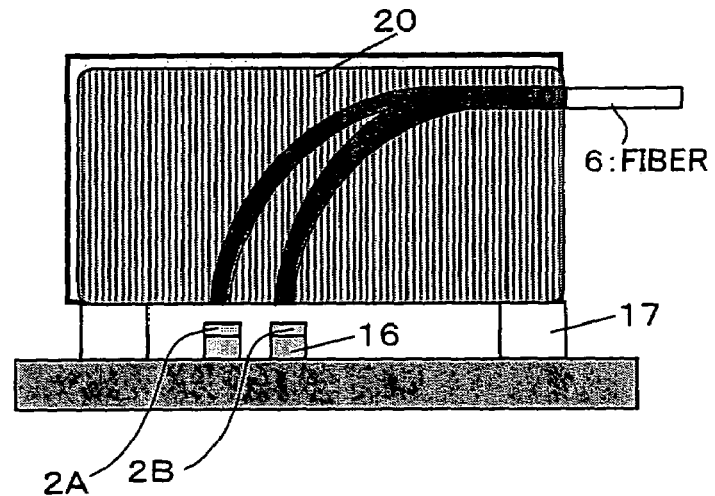
Figure 19C:
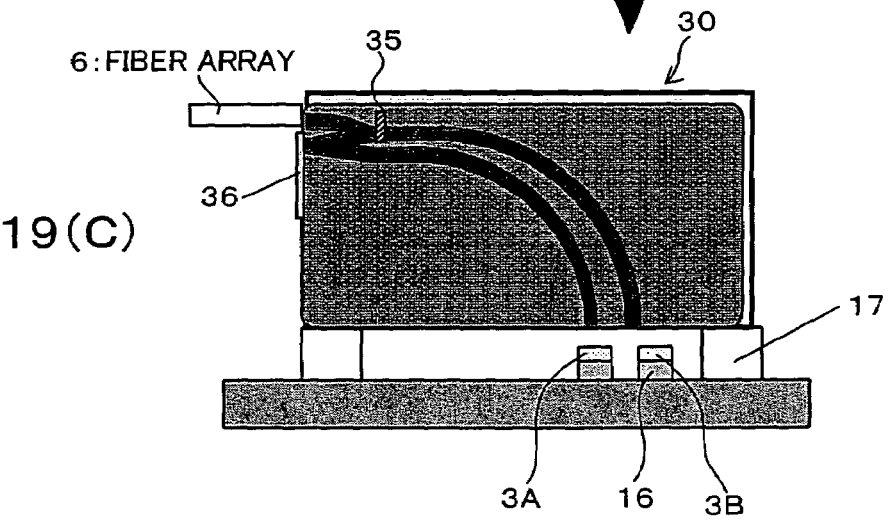

A transmitter waveguide block 20 and a receiver waveguide block 30 which include curved waveguides (in-plane curved waveguides) which are curved in a plane were fabricated using polymer, and the transmitter waveguide block 20 was mounted on a printed board 1 together with a planar light emitting device array 2 to fabricate a multi-channel optical transmitter while the receiver waveguide block 30 was mounted on the printed board 1 together with a planar photo-detector array 3 to produce a multi-channel optical receiver in such a manner as described hereinabove, whereafter an optical fiber array 6 was assembled in such a manner as seen in FIGS. 14(C) and 19(C) and the insertion loss of the curved waveguides which form the waveguide blocks 20 and 30 was measured in order to evaluate the transmission and reception performances. As a result of the measurement, the insertion loss including the coupling loss to each chip was 5.0 dB (980 nm) and 4.8 dB (850 nm) with regard to the optical transmitter (transmission side optical module) and 2.5 dB (980 nm) and 3.2 dB (850 nm) with regard to the optical receiver (reception side optical module). Thus, it was confirmed successfully that the waveguide blocks 20 and 30 fabricated in such a manner as described above are effective.

It is to be noted that the optical fiber array 6 was connected to the end face of the transmitter waveguide block 20 mounted on the printed board 1 and the end face of the receiver waveguide block 30 mounted on the printed board 1 through individual optical connectors (not shown) as seen in FIGS. 14(C) and 19(C). Thereupon, the planar light emitting lasers were energized to perform positioning by active alignment.

[Optical Transceiver]

The wavelength division multiplexing multi-channel optical transceiver according to the present embodiment can be configured by sticking the optical transmitter configured in such a manner as described above and the optical receiver configured in such a manner as described above to each other on the rear face side of a printed board to integrate the optical transmitter and the optical receiver with each other.

[Operation and Effects]

Accordingly, with the optical module, optical transceiver and fabrication method for an optical module according to the present embodiment, there is an advantage that optical connection between the planar optical devices [for example, face light emitting lasers, photo-diodes (photo-detectors) and so forth] mounted on the printed board 1 and the optical fibers attached in parallel to the printed board 1 can be implemented simply and readily similarly to those of the first embodiment described hereinabove.

Particularly, where such a configuration as described above is adopted, a wavelength division multiplexing multi-channel optical transceiver of a small size can be implemented simply and conveniently, and remarkable enhancement of the transmission band can be achieved.

[Others]

The present invention is not limited to the embodiments specifically described above, and variations and modifications can be made without departing from the scope of the present invention.

What is claimed is:

1. An optical transmission system, comprising:
   two optical modules, each of said optical modules comprising:
   a substrate;
   one or a plurality of planar optical devices mounted on said substrate; and
   a waveguide block including a flat surface and one or a plurality of curved waveguides formed on the flat surface;
   said waveguide block being mounted on said substrate such that the flat surface on which said curved waveguides are formed is perpendicular to said substrate and said curved waveguides and an incidence face or an emitting face of said planar optical device are opposed to each other on one end face of said waveguide block, and being configured so that an optical fiber can be connected to an other end face of said waveguide block which is orthogonal to the one end face;
   said two optical modules being optically connected to each other by an optical fiber array formed from a plurality of optical fibers;
   said optical fiber array being connected to said two optical modules while twisted by 180 degrees between said two optical modules such that the longest one of said curved waveguides of one of said optical modules and the shortest one of said curved waveguides of the other one of said optical modules are connected to each other.

* * * * *